(12) United States Patent
Degaugue et al.

(10) Patent No.: US 11,042,917 B2
(45) Date of Patent: *Jun. 22, 2021

(54) COORDINATING PRODUCTS AND SERVICES FOR CUSTOMERS

(71) Applicant: Instaply, Inc., San Francisco, CA (US)

(72) Inventors: Fabien Ghislain Degaugue, Sausalito, CA (US); Yevgeniy Eugene Shteyn, Cupertino, CA (US)

(73) Assignee: Instaply, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,979

(22) Filed: Jun. 24, 2019

(65) Prior Publication Data

US 2020/0151791 A1 May 14, 2020

Related U.S. Application Data

(63) Continuation of application No. 15/005,710, filed on Jan. 25, 2016, now Pat. No. 10,332,169.

(51) Int. Cl.
*G06Q 30/06* (2012.01)
*H04L 12/58* (2006.01)
*G06T 11/20* (2006.01)

(52) U.S. Cl.
CPC ........ *G06Q 30/0613* (2013.01); *G06T 11/206* (2013.01); *H04L 51/16* (2013.01); *H04L 51/34* (2013.01)

(58) Field of Classification Search
CPC ... G06Q 30/0613; G06T 11/206; H04L 51/16; H04L 51/34
USPC .......................................................... 705/26
See application file for complete search history.

(56) References Cited

U.S. PATENT DOCUMENTS

| | | | |
|---|---|---|---|
| 6,529,948 B1 * | 3/2003 | Bowman-Amuah | G06F 9/4493 709/217 |
| 2006/0149687 A1 * | 7/2006 | McLemore | G06Q 30/0603 705/400 |
| 2007/0112671 A1 * | 5/2007 | Rowan | G06Q 20/10 705/39 |
| 2010/0145842 A1 * | 6/2010 | Rao | G06Q 40/04 705/37 |

* cited by examiner

*Primary Examiner* — Frantz B Jean
(74) *Attorney, Agent, or Firm* — Perkins Coie LLP

(57) ABSTRACT

A computer-implemented system keeps records of communications between participants as a conversation. All communications between participants in a transaction are stored as part of the conversation including documents, photographs, forms etc. needed to complete the transaction. A computer system interacts with a wallet service of one or more participants to keep a record of, or to affect the transfer of, consideration between participants in the transaction. Conversations can occur for any topic or conversations for a particular topic can be selected and a template provided for documents and/or conversation participants most often needed to complete an associated transaction.

20 Claims, 20 Drawing Sheets

COORDINATING PRODUCTS AND SERVICES FOR CUSTOMERS

CROSS-REFERENCE TO RELATED APPLICATION(S)

The present application is related to U.S. patent application Ser. No. 14/286,907, filed on May 23, 2014, entitled SYSTEM AND METHOD FOR FACILITATING TRANSACTIONS AS CONVERSATIONS BETWEEN PARTICIPANTS (U.S. Pat. No. 9,548,957), which is hereby incorporated by reference in its entirety. The present application is a continuation of U.S. patent application Ser. No. 15/005,710, filed on Jan. 25, 2016, entitled COORDINATING PRODUCTS AND SERVICES FOR CUSTOMERS (U.S. Pat. No. 10,332,169), which is hereby incorporated by reference in its entirety.

TECHNICAL FIELD

The technology described herein relates to computer and communication systems and in particular to computer and communication systems to facilitate transactions between users.

BACKGROUND

For anything but the most simple of transactions, a person often uses multiple electronic devices and communications media to communicate with several parties in order to complete a transaction. For example, in the case of an automobile accident, a party may need to involve the police, witnesses, car body repair shops, insurance agencies, attorneys and maybe others to settle a claim and repair a car. Letters drafted on computers are sent between parties, phone calls are made, e-mails are sent, text messages exchanged, video conferences conducted. All associated parties keep track of all these communications in order to make sure that the underlying issues are resolved.

Given the complexity of tracking, storing and analyzing records of each of these communications, there is a need for a system that can help reduce transaction costs by facilitating communications between parties about a transaction in order to see a transaction through to its completion.

DETAILED DESCRIPTION

Figure 1:
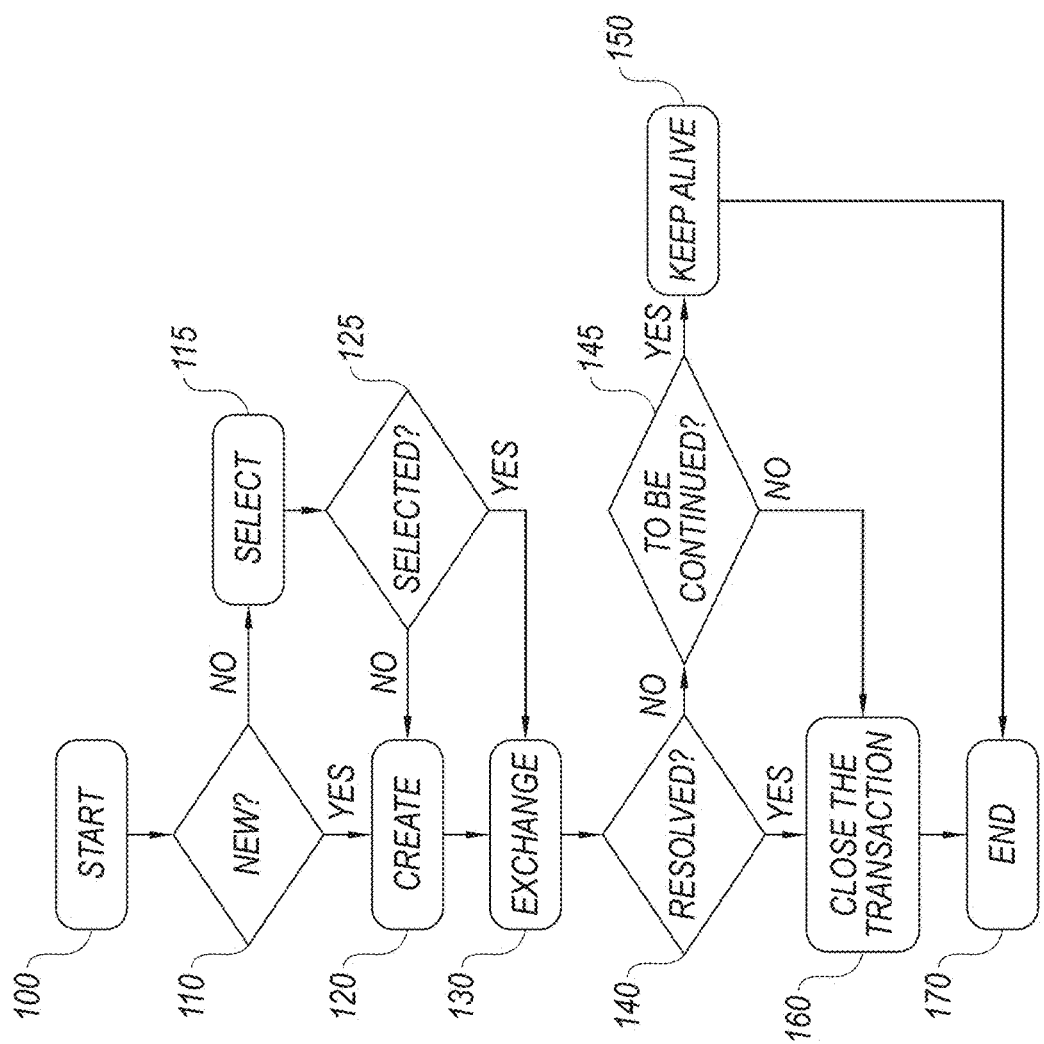
FIG. 1 is a block diagram of a top level conversation process.

Systems and methods for coordinating services provided by sub-contractors and/or multiple departments within an organization, such as via a service provider that facilitates the exchange of information and other communications between the sub-contractors, employees, and customers seeking their provided services, are described. For example, customers may engage with a service provider (e.g., a company or other similar entity) via a communication platform, such as a platform that facilitates the exchange of messages between the customers and the service provider, in order to seek and obtain products and/or services via the service provider.

The customers may communicate with the service provider for a variety of reasons, such as to obtain information about a product or service, to provide information about a desired product or service, to provide payment for an obtained product or service, to determine product or service delivery dates or other associated information, and so on. The service provider, based on the exchange of information with the customers, may coordinate the identification of and communication with various sub-contractors and other specialized providers of products and services, which provide the specialized products and services. Thus, the service provider, via the communication platform, enables customers to accomplish various requested goals (e.g., buy, register, and insure a car, take a day trip, remodel a house, and so on), and enables sub-contractors to provide their products and services to the customers to fulfill the goals requested by the customers.

In some embodiments, the systems and methods, via the communication platform, provide various modules configured to coordinate interactions between customers, the service provider, and the various sub-contractors. For example, the communication platform may include a messaging module that accesses a message from a customer of a service provider, wherein the message includes content representing a request from the customer to provide one or more services that combine to fulfill a goal, a services module that identifies one or more sub-contractors capable of providing the one or more of the services that combine to fulfill the goal, a journey module that determines a journey of actions to be performed with respect to the identified sub-contractors to realize the goal, and an action module that performs the actions within the journey of actions. Additionally, the communication platform may include an analytics module that collects and analyzes data about transactions, such as data associated with transaction efficiencies.

For example, the journey module may generate, create, and/or utilize a graph of various paths, each representing products or services provided by the sub-contractors, which, when combined, form various journeys within the graph between beginning or entry nodes and nodes that represent the goals provided by the customers. A journey, therefore, may include a series or group of sequential or non-sequential interactions or actions that, when performed or facilitated (e.g., following a path), result in the completion of a transaction. A path may represent a journey. A portion of a path may represent a journey. Multiple paths may represent a journey.

Therefore, the journey module may build or utilize a graph of paths connected to one another by nodes, wherein each of the paths represents a service provided by a sub-contractor, and wherein an unbroken connection of paths between a beginning node and one or more ending nodes represents a journey to a goal, and selects journey within the graph that connects the beginning node to an end node. The selection of a journey may be based on constraints provided by the customers, such as time or budget constraints.

The systems and methods, therefore, manage and coordinate the exchange of information between various parties associated with fulfilling customer goals. This centralized coordination and/or distribution may lead to high service reliability for the customer, a high quality of interactions between parties, a low cost of providing services, and an efficient procurement of products and services for customers, among other benefits.

In order to coordinate the exchange of information between such varied, disparate parties, the communication platform may maintain and track transactions between parties as conversations between the involved parties/participants (e.g., customers and sub-contractors). The following section provides various details describing the use of transactions, conversations, and other exchanges or information and/or actions performed over various communications media that are associated with a service provider. Further details regarding the management and coordination of information between various parties associated with fulfilling customer goals will follow.

Examples of Facilitating Transactions Between Customers and Service Providers

As discussed herein, the purpose of the system described herein is to facilitate collaboration and transactions between participants in a commercial, governmental, non-profit, social, etc. setting. These transactions can include, but are not limited to, negotiating a purchase, contract, and/or commitment, providing a service, effecting a customer support session, arriving at an agreement between people on a future course of action, resolving an issue, developing an idea, prioritizing action items, assembling a document and/or document package to support a claim, etc.

A computer and communications system keeps records of transactions as a conversation between participants. Communications between participants include streams of information exchanges comprising fragments, e.g. text messages, pictures, audio and video segments, requests, orders, promises, location information, delivery options, comments, questions, legal documents, schedules, money, meta-data, etc. A transaction can include the exchange of goods, services, information, considerations, promises, etc.

Participants in a conversation can include teams and individuals (e.g. team—team; team—individual; individual—individual). Teams can be formal and informal entities, formal/Legal (Corporations, Universities, Governments, Families) or informal (Friends, Acquaintances, Extended Family, Co-workers, Countrymen, etc.). Individuals can be human, animal, and artificial (e.g. automated services).

Conversations can be new, continuing or recurring.

Depending on the nature of the transaction, teams, and individuals involved, individuals and teams can be assigned different "hats", e.g. customer, husband, employee, contractor, advisor, authorized agent, boyfriend, team member, calendar, etc. More than one "hat" can be assigned to an individual or a team at the same time.

To explore the feasibility and/or conduct a transaction, parties create at least one conversation and invite teams and individuals to discuss or join the conversation as appropriate.

Conversations occur between individuals, but, depending on the "hats" assigned to the individuals, teams can own and participate in the conversations.

In one embodiment, a computer system stores records of free-form conversations where the users are invited to define the participants in the conversation, the documents to be transmitted or communications to be sent between participants. In another embodiment, the computer system provides templates for transactions and related conversations to handle pre-defined scenarios, e.g. an Auto Accident Insurance Claim, Airport Arrival, Service Sign-up, New Hire, Apartment Rental, Contract Negotiations, Product/Service Delivery, Product/Service Feedback, Customer Support, etc. Users of the system are enabled to use default templates or create their own. Furthermore, the system can rate templates with regard to the efficiency of completed transactions, i.e, getting job done.

In one embodiment, individuals and teams are introduced to each other via a "Say Hi" mechanism. The mechanism makes one party (individual or team) aware of another party, which becomes a potential transaction partner, e.g. in a pre-defined scenario. In some transactions, an introduction is performed over different communication channels. For example, a customer contacts the service provider over the phone and receives a text message in response (e.g., with an invitation to connect online and continue the conversation over text messaging communications media).

Parties in a transaction engage in conversations that involve an offerable (product, service, experience, etc.), its description, price, invitations to make an offer (advertisement), conditions of sale, availability, quality, delivery options, distribution of money between parties, contract terms, complaints, etc.

A conversation can be split into multiple conversation streams and routed to different teams and individuals.

Records of conversations are stored and analyzed to evaluate transaction efficiency, value creation, satisfaction, team/individual performance, dispute arbitration, etc.

Parties in the transaction are enabled to allocate and distribute money or equivalent consideration between themselves and third parties. The money or its equivalent exchanged during the conversation may represent an official record of receipt. The money can be transferred through various mechanisms, e.g. a digital wallet service, which is tied to the user's bank account, credit card account, Amazon Flexible Payment System (Amazon FPS), PayPal, BitCoin, frequent flier, affiliation card, etc.

The system keeps records, including time, location stamps, and hash codes, of individuals, teams, conversations, relationships, transactions, etc.

In one embodiment, the computer and communications system provides Application Programming Interfaces (APIs) to third parties programs that desire access to the conversation in real-time and/or related records through a database.

The system and third parties may exchange identifying information that allows them to match (e.g. positively, negatively, partially, individually, in aggregate) teams, individuals, transactions, conversations, etc.

The system and third parties may exchange the contents of conversations and related meta-data, such as date, time, response time, number of parties involved, number of conversation branches, considerations transferred, participants' and observers' subjective evaluation of the transaction efficiency, emotional markers, etc.

The following is a non-exhaustive list of sample transactions for which a user may wish to maintain a record of a conversation: service registration (e.g., buying, registering, and insuring a car; coordinating services delivery between various internal enterprise departments); auto accident claim, airport arrival; new hire onboarding; new employee orientation; signing up for health benefits; buying a mobile phone with or without a carrier contract, buying, delivering, installing, repairing, replacing a heater for the house; employee/team performance evaluation; filing a medical insurance claim; ordering a meal, paying, and giving a tip at a restaurant; disputing a service bill; requesting legal advice; delegation of authority during vacation; resolving a customer support issue; arranging a birthday party and procuring supplies; test performance discussion between student, parent, teacher, tutor, and school principal; getting advice from a brick-and-mortar or online store employee and/or another consumer with proven product/service experience; and contacting distant relatives in a foreign city.

Human interactions about private, pubic, and commercial matters typically involve multiple information exchanges that comprise objective and subjective data. The exchanges take place between people, organizations, and/or automated systems that help facilitate transactions make them less expensive, e.g. in terms of time, money, and efforts of the parties involved. The exchanges can be thought of as virtual assembly lines for services that can be represented, e.g. by a graph of relationships and transactions. When an individual service fails to be delivered in the right place, at the right time, in the right quality and quantity, the entire assembly line stops, resulting in increased transaction costs. In some exchanges, e.g. customer support calls and interactions between a customer, a business and a sub-contractor, the transaction fails due to a drop of the connection during a communications transfer.

For example, a purchase of a product on a website or through a dedicated application may include at least some of the following operations: browsing product-related web pages, reading reviews, comparing competing and/or related product offerings, receiving product description and pricing information, filling out order information, submitting an order, paying, tracking the order, providing feedback on product and/or service quality, contacting customer service, resolving disputes, returning the product, e.g. when it doesn't satisfy one's needs, etc.

In another example, fixing one's car after an auto accident may involve but not limited to interactions with relatives, insurance companies, police, witnesses, other parties in the accident and/or their agents, auto repair shops, information services, emergency assistance services, courts, etc. The process includes collecting various documents, submitting them in accordance with pre-defined rules or procedures, obtaining or paying money, transferring calls, forwarding emails, routing web requests from one department or business to another, etc. It gets even more complicated when the accident involves medical claims because yet more parties have to be included in resolving the issue.

In a yet another example, encountering a new situation, such as arriving at an airport in a foreign city or starting a new job, may require discovering new information sources, accessing new services, acquiring new contacts, fulfilling new roles in transaction processes, entering new types of negotiations, and much more.

As more people use mobile device and related communication services, it becomes more difficult to address issues mentioned above using traditional web, voice, e-mail, SMS, video, and other modes of interaction. One purpose of the disclosed technology is to facilitate collaboration and enable efficient interaction in a broad variety of human environments: commercial, governmental, social, non-profit, etc.

Another purpose of the disclosed technology is to facilitate successful completion of commercial transactions between individuals and businesses that involve use of mobile connected devices.

Yet another purpose of the disclosed technology is to facilitate distribution of value among parties involved in commercial transactions and providing means for evaluating efficiency and value creation among employees and businesses involved in the transactions.

These and other advantages of the disclosed technology are accomplished by providing a system for conversation creation, maintenance, and management. A conversation is represented by a stream of messages generated by and distributed over a relationship graph. The system further enables insertion into the conversation representations of value, e.g. money or tokens, and means for distributing the value among the participants of the conversation.

FIG. 1 is a block diagram of a top level conversation process.

At step 100, the system starts the conversation, e.g. by launching an mobile application and initializing user environment with previous conversations, potential relevant contacts, value holders, connections to services, and other elements necessary to engage in a transaction.

At step 110, the system decides whether the user is going to continue an existing conversation, or create a new one. If the user chooses "New," e.g. pressing a corresponding icon on his or her user interface, the system goes to step 120. Alternatively, step 110 can be performed by the system automatically, depending on the context of the application, e.g. when the user opens up the application for the first time for registration.

If the "New" option is rejected in step 110, the system tries to select an existing conversation for the user to continue. If the process of selection succeeds, the system goes to step 130 where the parties involved engage in an information exchange. Otherwise, the system creates a new conversation at step 120. Each conversation has a unique identifier. The identifier can be generated explicitly, e.g. by generating a unique number, or implicitly by a combination of conversation attributes, e.g. concatenation of names of parties involved in the conversation and a random hash code.

Step 130 may proceed in real time or over an extended period of time, where parties exchange messages asynchronously.

In some implementations, the strength of the social connection between conversation participants determines when and how messages are delivered. For example, if a particular employee (or team member) contacted by a customer is not available, the customer's request can be either forward or escalated to other employees (team members) or not.

The customer and team member are enabled to "lock" their relationships, e.g. for a period of time. For example, only a specific Financial Advisor is allowed to reply to investment portfolio allocation questions within two days, provided the advisor is still available. The "lock", e.g. exclusivity of the relationship and its duration, can be determined in different ways.

In one implementation, the customer and/or team member explicitly define the terms of the relationship through their preferences.

In another implementation, the systems determines the terms by monitoring user interactions and calculating preferences, e.g. based on the number of interactions, their frequency, customer satisfaction statistics, and consideration exchanged.

In a yet another implementation, the system determines "lock" characteristics on a per-conversation or even per-message bases, e.g. asking the customer and/or team member whether at least one of them wishes to maintain the "lock" or exclusive conversation with the customer and/or sub-contractor.

In one more implementation, the system escalates a conversation if the customer accesses it in an emergency mode.

When a "lock is not present", a team receptionist (either human or automatic) is enabled to steer the conversation to an available team member. For example, when a new customer contacts Macy's sales service for the first time, the conversation is not locked. In another example, a sales rep at Macy's manages her own customer base. She does "clienteling" with top customers and keeps ownership of their customer base.

At step 140, the system decides whether the subject of the conversation has been resolved. If yes, the system marks the conversation as closed at step 160.

In some implementations, conversation parties are enabled to explicitly propose a closure, e.g. by pressing a "handshake" button. For example, when a deal is reached, the user presses the button thus confirming the conditions of a sale. The closure can be linked to a transfer of consideration via, e.g. a digital wallet service, implemented either as hardware, software, or a combination of both. The consideration can be transferred on a per transaction basis or for a package of products, services and/or experiences provided, customer journeys complete, etc.

Various user interface elements, e.g. icons, voice commands, gestures, etc. can be used to declare the outcome of the conversation. The process and its outcome is recordered, e.g. for accounting, auditing, analytics, and other purposes.

Similarly, the user can be prompted by another party to close the deal with a standard or customized user interface element, e.g. "Do you agree?" button.

Otherwise, at step 145 the system tries to determine whether the conversation is going to be continued. For example, parties may decide to continue their conversation at a later time. If that's the case, the conversation is kept alive, e.g. by assigning it an "alive" attribute and storing it in a database.

Otherwise, from step 145, the system proceeds to close the transaction at step 160. The process ends at step 170, with the conversation either closed or kept alive.

Figure 2:
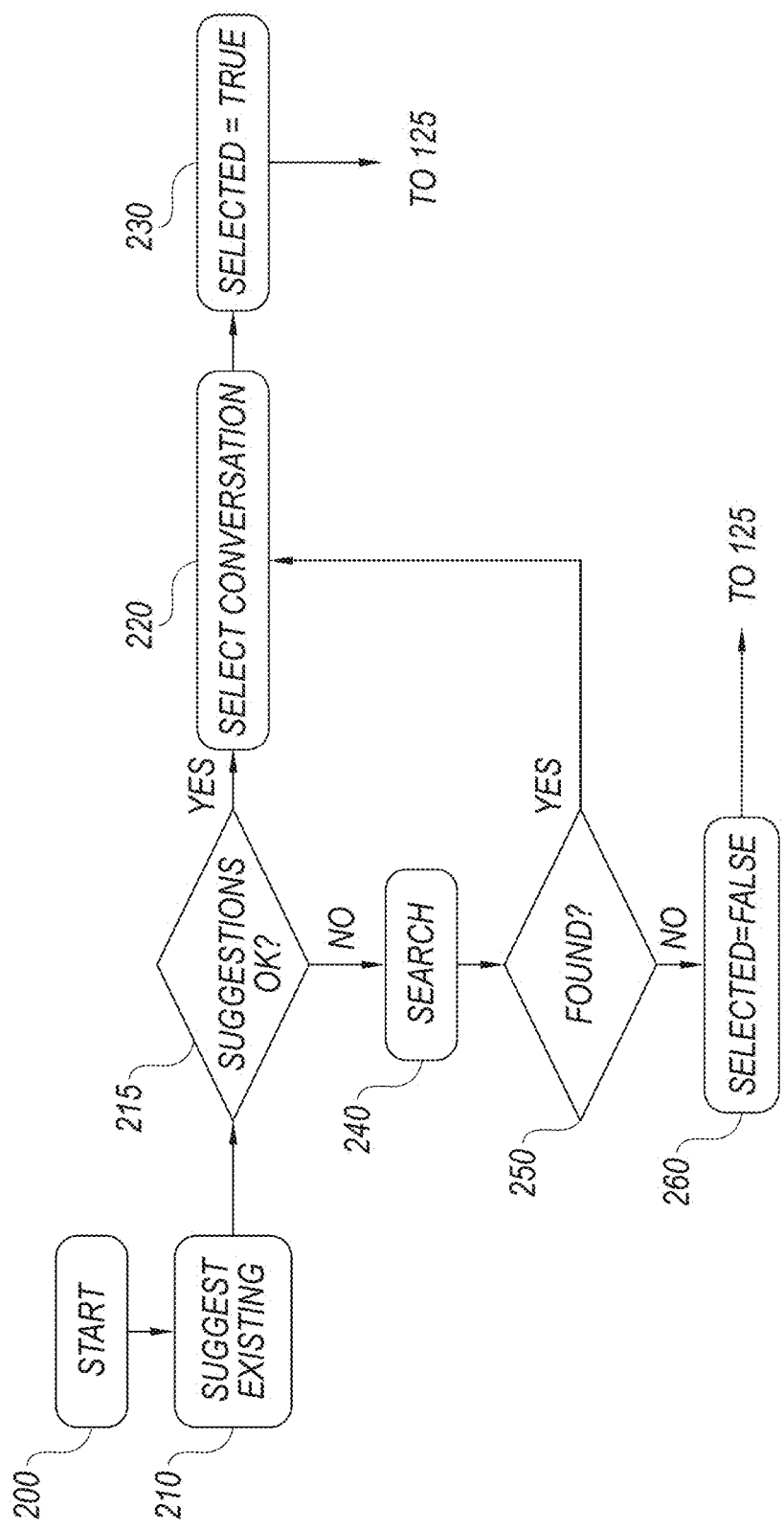
FIG. 2 is a block diagram of a process for conversation selection.

FIG. 2 is a block diagram of the process for conversation selection at step 115.

The process begins with initializing the system with existing live conversations—step 200, e.g. by accessing a conversation database using the user ID and/or local storage of recent conversations. The conversation database can be distributed and span multiple services, including social networks (personal, professional, business, private, public, protected, etc.). In some implementations, several user IDs can be used to identify the subject of the conversation with a sub-contractor.

At step 210, the system generates a suggestion for continuing at least one conversation. The suggestion can be made based on the last live conversation (default), user location, preferences, device context (other applications open), communications security channels available, transaction value, priority, business relationship, incentives, and other factors.

At step 215, the system decides whether the suggested conversations satisfy the user. If yes, the system proceeds to step 220 where the user selects a conversation.

Otherwise, the system enables the user to search for a conversation at step 240. The user can search for a conversation using conversation topics, parties involved, location information, transaction value, priority, business relationship, incentives, and other factors.

In another implementation, the user is enabled to browse a directory and pick a relevant conversation party, e.g. a service provider or a virtual consierge enabled to assist the the user to find the relevant conversation party.

In a yet another implementation, the system provides a combination of search and directory access mechanisms. For example, when a search for a specific French restaurant doesn't produce any matches, the user is presented with a directory of highly rated French restaurants listed in the system. The ratings of the restaurant can be derived from various factors, e.g. an average of star ratings from external review services such as Zagat; from users who have no relationship to the searcher; from the searcher's social network, the system's internal ratings based on previous conversations between the restaurant team and other users, or a combination of such ratings mechanisms.

If a conversation is found, the user goes to step 220 to select a conversation. Otherwise, the system notes that no conversation has been selected and proceeds to step 125 described on FIG. 1.

When user selects a conversation at step 220, the system identifies the conversation and sets the mode to Selected=True, and then transitions to step 125 described on FIG. 1.

Figure 3:
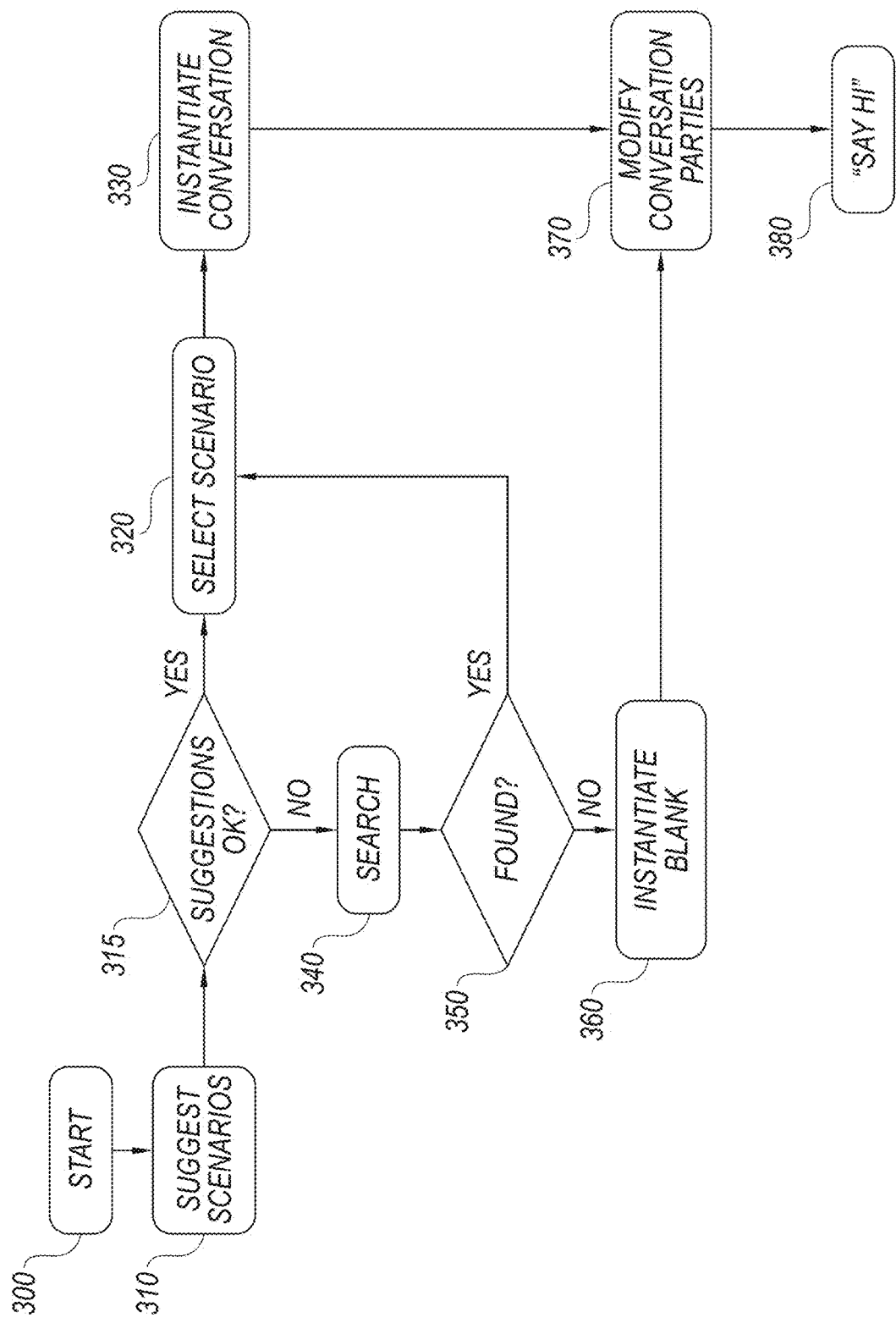
FIG. 3 is a block diagram of a process for conversation creation.

FIG. 3 is a block diagram of a process for conversation creation.

The system starts at step 300 by initializing potential conversation parties, communication channels, and scenarios.

At step 310 the system may suggest a number of typical pre-defined scenarios, e.g. Medical Emergency, Security Alert, Automobile Insurance Claim, Airport Arrival, New on the Job, New to the Neighborhood, Ordering Food, Entertainment, Buying a Car, Customer Support, Birthday Party, Deal Flow Review with a Sub-Contractor, etc. A particular service provider, e.g. listed in the directory, can present their own scenarios related to the services typically offered to customers. Default scenarios may differ based on the user's location, e.g. determined by GPS functionality. For example, when the user is located in the store, she may be presented with a "May I help you" scenario.

In one implementation, to directly invoke a predefined scenario, the user presses a dedicated hardware or software button, or by making an utterance, or by performing a pre-defined gesture such as moving their hand or eyes in a certain pattern. E.g. in case of danger, the user invokes a "911" scenario with a panic button where police and/or a private security service, including an automated surveillance system, would be at least one pre-defined party.

In another implementation, the system invokes a medical emergency scenario when a customer's vital signs are communicated to the device from other connected devices, such as heart monitor, blood pressure monitor, etc.

In a yet another implementation, the system invokes an Auto-Insurance Claim scenario when the user's automobile sends a signal of an accident, e.g. when the airbag is deployed, or the automobile's security system is triggered, or the glass is broken, etc.

In a yet another implementation, a third party invokes a conversation scenario. For example, in a "Health Check," a medical nurse contacts the user remotely to acquire vital signs for a periodic checkup. Similarly, a parent invokes an "Everything's Ok?" scenario when the child is not home at a pre-defined time. In all cases, the third party can be a human individual, an animal, an artificial pre-programmed agent or a combination of the above.

At step 315, the system decides whether the proposed scenarios are suitable to the situation. In one implementation, the user makes the decision. In another implementation, the conversation takes place in the background between artificial agents, e.g. medical devices that determine whether measured vital signs warrant human intervention. In a yet another implementation, the police determine the level of danger based on data from surrounding people and/or security cameras.

If the suggested scenario(s) is ok, the system proceeds to step 320 where it selects the scenario. Otherwise, the system enables a search for a suitable scenario (step 340).

If the scenario is found (step 350), the system proceeds to step 320 (Select Scenario). Otherwise, the system goes to step 360 and instantiates a blank conversation.

At step 330, the system instantiates a conversation according to the scenario selected at step 320. A detailed description of step 330 is provided below.

At step 370, the system modifies conversation parties. In one implementation (e.g. an auto accident scenario), the user chooses to replace the name of his/her insurance agent. In another implementation, the user chooses to add his/her spouse. In a yet another implementation, the user chooses to add his/her favorite car repair shop. In one more implementation, the user chooses to replace a specific person with a business.

At step 380, the system either generates default messages (conversation starters) to all conversation parties, or enables the user to create the messages, or a combination of both. A detailed description of step 380 is provided below.

Figure 4:
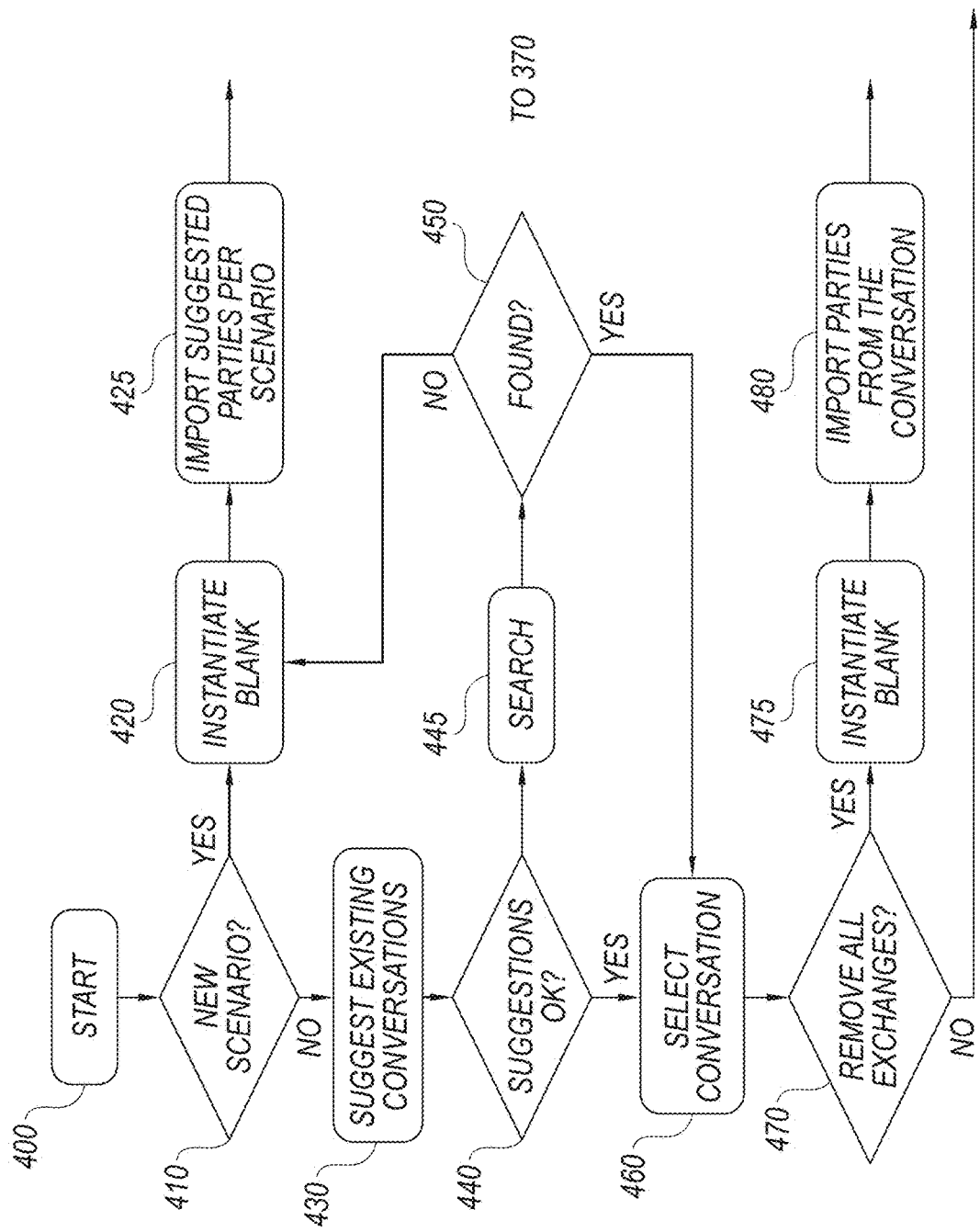
FIG. 4 is a block diagram of a process for instantiating a conversation from a scenario.

FIG. 4 is a block diagram of a process for instantiating a conversation from a scenario. The system can run it separately or as step 330 in FIG. 3.

The purpose of the process is to allow the user to create a conversation either from a previous similar conversation of the same scenario, or use a blank scenario prototype.

At step 400, the system initiates a look up of a scenario-based conversation that can be used as a sample for a new conversation. At step 410, it decides whether it is a new scenario for the user or his/her team or his/her business. The scope of scenario novelty depends on at least one of the following: user preferences, conversation experience, team and/or business affiliation, whether the user is human or artificial, services involved, location, timing, etc. The system may also apply a security, confidentiality, and/or privacy context to exclude unauthorized access to data from previous conversations.

In one implementation, a business uses a standard scenario for all conversations of a certain scenario type. For example, for a new employee orientation message exchange a standard scenario includes mandatory roles of a Human Resources Manager, Department Manager, IT specialist, and Security specialist.

In another implementation, potential previous conversations for a given scenario include only conversations of the user's team members. For example, an insurance agent uses by default contacts from a previous conversation of his department staff that interacted with the same customer.

In a yet another implementation, the user starts a conversation with his doctor's nurse. The conversation by default adds contacts of his spouse, doctor, and pharmacy.

In a yet another implementation, customer support conversations available to the user as prototypes only include those that were marked as highly satisfactory.

If at least one previous conversation with the same scenario is found, the system suggests at least one existing conversation at step 430. After that, at step 440 the system decides whether the suggestions are ok, e.g. with user preferences or the composition of the parties, and selects a prototype conversation at step 460.

At step 470, the system decides whether to remove all previous message exchanges from the conversation or not. The decision depends, e.g. on privacy, security, confidentiality, relevancy, and other conditions.

In one implementation, the decision is made automatically because the conversation involves financial transactions and user identifying information that the system is not set up to share in an insecure connection environment.

In another implementation, the decision is left to the user who can press, e.g. a Clear button, to remove all conversation elements except the parties involved in the conversation. For example, in an auto insurance claim scenario, all previous information specific to the accident is removed because it involved a different set of circumstances.

In a yet another implementation, the system delegates the decision to a team supervisor (or some other third party) who is not going to be a part of the conversation, unless it is escalated and identified as such.

If the decision is to remove all exchanges, the system instantiates a blank conversation at step 475, registers it with the system, and import participants from the prototype conversation. If not, the system proceeds further, e.g. to step 370 from FIG. 3 to allow the user to modify participants, both their roles and specific individuals.

If at step 410, the system decides that the scenario is new, it instantiates a blank conversation at step 420, registers it with the system, and imports suggested party roles according to the scenario, without instantiating the actual individuals. That is, the user and/or his/her team are supposed to fill in specific individual contact info to start the conversation.

For example, in an Auto Accident scenario, the system creates a prototype conversation with roles of Insurance Agent, Police, My Lawyer, Witness 1, Monitoring Service (an artificial agent that records all communications in a conversation), Repair Shop, Medical Service, The Other Party, and The Other Insurance Agent. The user is supposed to fill in specific names on the next step (see FIG. 3 description).

If at step 440, suggested conversation is not approved, the user is enabled to perform a search within the scope of previous conversations (step 445).

In one implementation the system performs search over all user conversations.

In another implementation the system performs search over conversations in the same city.

In a yet another implementation the system performs search over conversation within a given time interval in the past, e.g. last year.

In one more implementation, the system performs search over conversations with people within the same demographic range with the user.

In yet another implementation, the system performs search over conversations rated above a certain user satisfaction threshold.

In one more implementation, the system performs search over conversations with people who belong to the person's social or business network.

If a desired conversation is found (step 450), the system proceeds to step 460. Otherwise, it goes to step 420.

Figure 5:
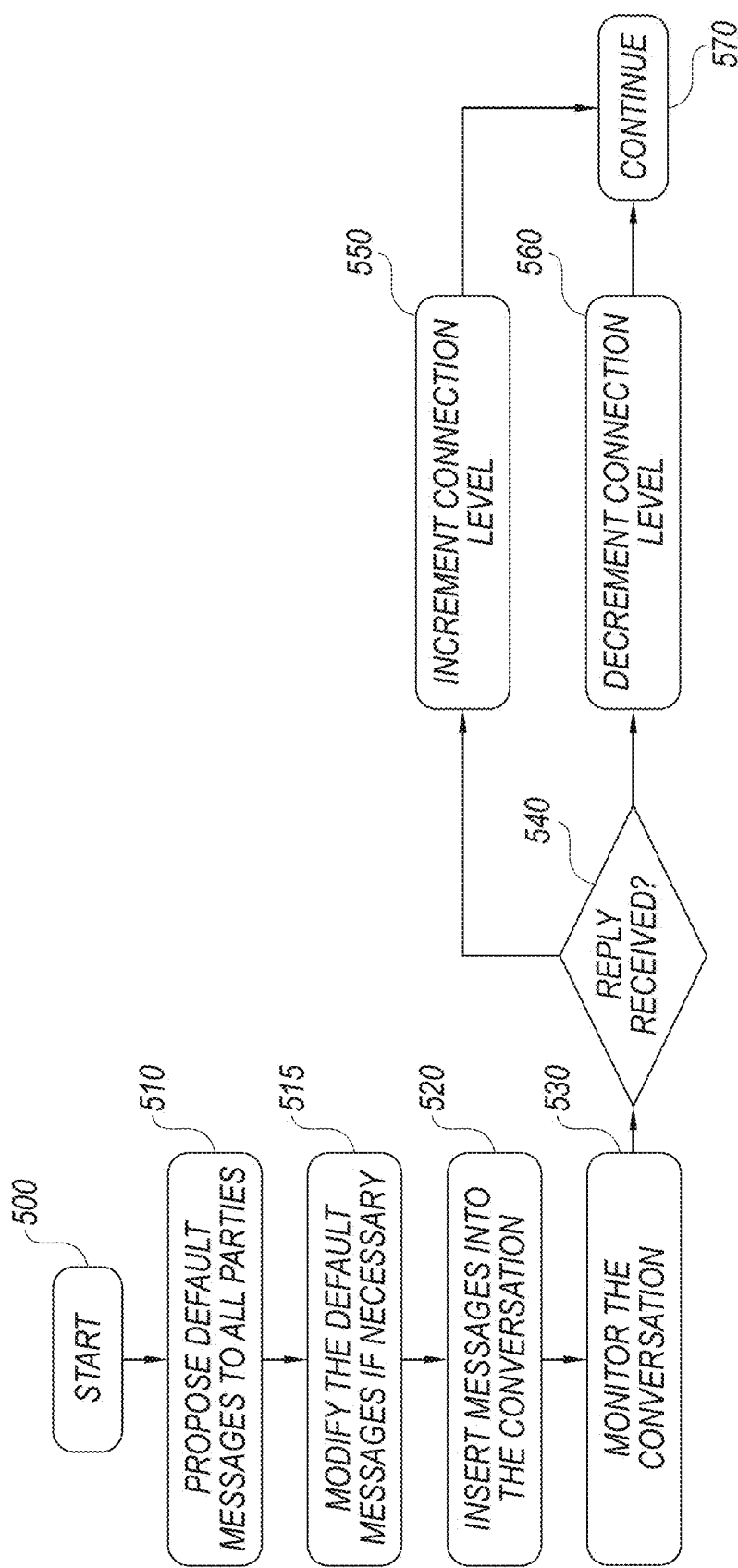
FIG. 5 is a block diagram of an initial interaction within a conversation ("Say hi").

FIG. 5 is a block diagram of the initial interaction within a conversation ("Say hi"). The purpose of the process is to introduce participants to each other and to establish the level of social or business connection between them.

At step 500, the system creates an instance of the conversation with potential parties and roles involved. For example, when the user opens the application for the first time, the system creates a conversation and populates it with businesses and/or community organizations that are preferred by local residents. The system also provides a list of answers Frequently Asked Questions (FAQs), the questions and answers can be determined statically and/or dynamically, based on their frequency, relevancy, commercial value of potential outcomes, etc.

In another example, when a new employee joins the company, the system populates his "Say hi" conversation with an HR rep and his team members.

In a yet another example, after being acquainted with his team, the new employee is prompted to "Say hi" to the customers that his predecessor on the job interacted with most productively.

In one more example, an automatic "Say hi" message is customized, depending on the former relationship between the parties, including characteristics of the target group and/or team.

At step 510, the system proposes default greeting messages to be sent within the conversation. In one implementation, the message includes at least one of: name, address, email information, phone number, working hours, etc.

In another implementation, the message includes a brief greeting in the user's language (Hi, I'm John.)

In a yet another implementation, the message includes a personal introduction from a friend who referred the user to the service.

In one more implementation, the message includes a request for information, e.g. "What are your working hours?" "What's my budget for the month?" "How many open service requests from zipcode 95014 do we have in the current pipeline?", etc.

At step 515 the user is enabled to modify the default messages, e.g. to personalize the greeting.

At step 520, the system inserts messages into a conversation and sends them to all parties involved.

At step 530, the system monitors the interaction between parties over a period of time, while the user is within a certain location, or until a certain condition is met.

At step 540, the system checks whether a reply has been received from at least one of the conversation parties. If yes, the system increments the connection level between the parties involved (step 550). Otherwise, the system decrements the connection level (step 560), or leaves it unchanged.

The connection level can be used to determine the strength of the social or business connection between the user and other parties. For example, the next time the user searches for a business service of a certain time, only businesses with a certain connection level are included in the search. The system may also take into account whether a human or automated reply has been received.

In one implementation, the user is enabled to request only human conversation parties for a given scenario.

The "Say Hi" process can be used for any introduction to a new situation, such as service registration, scenario initiation, arrival at a location (airport), online greetings, first walk-through on a new device to get acquainted with available device features, receptionist services, and etc.

In one implementation, the process is executed in a newcomer mode, where the user is completely unfamiliar with the potential conversation parties and needs to learn everything from scratch.

For example, when one arrives at Paris (CDG) airport for the first time, his "Say hi" application proposes conversations with the airport information service, a highly rated airport sports bar, a money exchange service, and his airline's connection service.

In one scenario, ratings are derived from reviews and evaluations from the members of the general public derived from 3rd parties, e.g. Yelp, Amazon, etc. The system also enables to use ratings based on feedback from one's social network connections, e.g. Facebook friends (or friends of friends), other sub-contractors, LinkedIn colleagues, followed Twitter feeds, etc. In another scenario, ratings are derived from reviews and evaluations from the system's users only. Such ratings are preferred because they contain information about outcomes of the conversation, such as a sale, a thank you message, a complaint, etc.

In another implementation, the process is executed in the "local" mode, where the user assumes an identity of a local person, highly experienced in the surroundings.

For example, when one moves a new neighborhood in San Francisco, the system proposes to him to "Say hi" to businesses frequented by people with similar preferences and/or demographic characteristics. For that purpose, the system may initiate a Q&A session with the user prior to the arrival. Alternatively, the may make inferences from the user's history of transactions and create a model profile to be used in the future.

In a yet another implementation, the process is executed in the "human" mode, where the user desires to talk to humans only. In that case, the system contacts businesses and/or team members who are available in real time.

Figure 6:
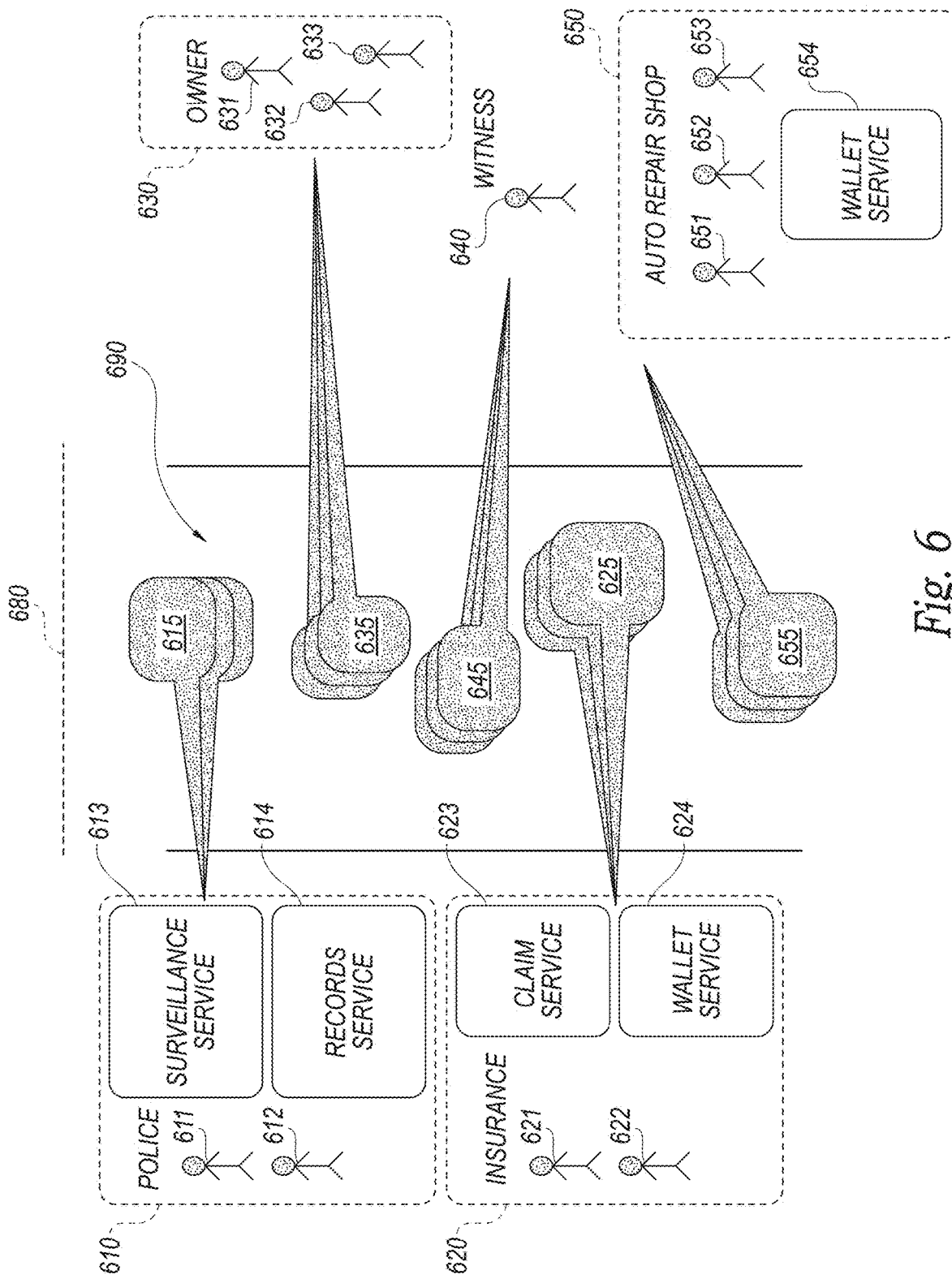
FIG. 6 illustrates an auto insurance claim user scenario enabled by the system of the disclosed technology.

FIG. 6 illustrates an auto insurance claim user scenario enabled by the system. According to the scenario, Bob is a car owner 631. An unknown person broke the car's side window and stole Bob's laptop. Since Bob's car is insured, he wants to submit an insurance claim, recover some of the damages, and fix the car. The claim process involves multiple parties, e.g. Police 610, Insurance Company 620, Bob's wife 633 and lawyer 633, Witness 640, Data Recovery service (not shown), and Auto repair shop 650.

The insurance claim process involves coordination between multiple parties to arrange for several major steps that include, but are not limited to submission of evidence, furnishing a police report, filing a claim, towing the car, providing an estimate for repairs, and repairing the car. The entire process constitutes a customer journey aimed at getting the issue resolved, e.g. car fixed and data recovered, through coordinated activities of the parties involved.

In case of emergency, the conversation can be escalated to all participants, or a specific team, or a specific member within the team.

To facilitate the transaction Bob uses an implementation of the system of the disclosed technology and creates conversation stream 680.

In one implementation, Bob creates a new conversation manually and adds all the parties himself.

In another implementation, Bob uses a default Auto Insurance Claim Scenario provided by the system or his Insurance Agent 621, and adds relevant parties. When the system notices that Bob's laptop is missing it adds Data Recovery service to the conversation.

In a yet another implementation, Bob contacts his Insurance Agent 621, via telephone (not shown), who creates the conversation as a standard means to process customer claims and adds Bob to the conversation via a text messaging application.

In one more implementation, Police Officer 611 creates the conversation when Witness 640 reports the burglary.

Participants of the conversation are organized as teams. All messages and digital communications (conversation fragments), e.g. pictures of the car, repair estimate document, and others, become a part of the conversation stream accessible to all team parties. Conversation participants may or may not know each other personally. In the present example, Bob knows personally Insurance Agent and Auto Repair Mechanic 651 from previous interactions. Conversations fragments can be sent to individuals as well as teams based on the context, e.g. privacy, security, family relationships, business relationships, urgency, time and location of the accident, estimated damage amount, etc.

In some implementations, all fragments are available to all internal team members. In other implementations conversation fragments are distributed according to pre-defined rules. In a yet another implementation conversation fragments are distributed according to predefined rules arranged according to team structure (team graph) and/or context. Team graph can be implemented as flat, hierarchical, distributed, or a combination of thereof.

In one more implementation, certain conversation fragments e.g. value tokens, are distributed over secure channels only. The value tokens and/or their fractional values can be tracked, e.g. using a company accounting system, ad-hock social/business arrangements, digital wallet procedures, block chain records, etc.

All fragments are given at least a time stamp and/or a hash value and associated with the conversation ID.

Conversation participants see and enter fragments on their devices in a conversation stream 690.

Bob's team 630 comprises himself 631, his wife 632, and his lawyer 633. The team may use the system separately as a private means to discuss the accident among themselves concurrently with conversation 680. Conversation fragments can be marked and/or removed from the record based, e.g. on Attorney-Client privilege rules, pre-defined expiration period, etc.

Police team 610 comprises Police Officer 611, Records Clerk 612, Surveillance Service 613, and Records Service 614. Surveillance and Records Services are computer implemented systems (artificial individuals) enabled to receive, process, and send conversation fragments.

For example, Surveillance Service can be implemented as a digital media database with a conversation interface responsive to structured and/or free-form queries. In another example, Surveillance Service is implemented as a digital/photo video camera system with storage. It can be a fixed and/or a portable camera, or a combination of multiple cameras attached to a building, person, car, helicopter, drone, etc.

In one more example, Surveillance Service can be implemented as a text-based system containing reports from private and public sources. In one implementation, a system of the disclosed technology can be used as a Surveillance Service gathering inputs (fragments) from multiple observers (human, animal, artificial).

Records Service provides police reports necessary for processing insurance claims. It can be implemented as a digital document repository with an interface responsive to conversation fragments. For example, it can provide detailed police report data based, e.g., on report ID, accident location information, car ID, owner, suspect, police officer, and a combination of such multiple identifiers.

Insurance team 620 comprises Insurance Agent 621, Claim Adjustor 622, Claim Service 623, and Wallet Service 624. Wallet Service 624 is a computer-implemented system enabled to process payments, e.g. receive instructions, send and receive value tokens, using the conversation interface. Value tokens can represent currency, coupons, credits, game currency, bitcoins, affiliation card points, etc. The service can be implemented as a third party financial transaction system, e.g. digital wallet, credit card processing service; or as a value transfer subsystem to the conversation system; or a combination of both.

Similarly, a third party application can use the interface to communicate to the services and consumers. The system is enabled to charge commissions, e.g. as a percentage and/or fixed and/or variable fee, for accessing the interface and/or concluding transactions.

In an internal implementation case, Wallet Service keeps track of considerations users provide in return or advance for products and services. Users are enabled to buy internal credits using official government currencies or other means of payment, e.g. loyalty points, BitCoins, etc.

Auto Repair shop team comprises Mechanic 651, Shop Owner 652, Receptionist 653, and Wallet Service 654.

During the process of Conversation 680, parties exchange multiple conversation fragments 615, 625, 635, 645, and 655, pertaining to the transaction. Communications and user interface components of the system, e.g. mobile apps, place the fragments into Conversation Stream 690 available to conversation parties on their respective conversation devices, such as smartphones, tablets, digital watches, digital glasses, television screens, computer monitors, electronic readers, brain-computer interfaces, equipment control panels, etc.

In one example of the Auto Insurance Claim scenario (FIG. 6), car owner 631 finds his car burglarized. The burglar flees the scene, but Witness 640 agrees to confirm the fact of the crime. Owner 631 starts a conversation application on his mobile device and locates Auto Insurance Claim Scenario (see FIG. 3 description above). Using the "Say Hi" logic, the app proposes to start a conversation with key parties: Police, Insurance, Owner, Witness, and Auto Repair Shop. Owner 631 asks Witness 640 for some personal information and locates him within the system. The system invites Witness to join the conversation. Since Witness 640 is a registered user, Owner 631 doesn't have to provide detailed personal information to the owner. He also doesn't need to provide his account of the accident, unless requested later.

Witness 640 leaves the scene. Owner 631 uses a step-by-step "Say Hi" process to send customized messages to all parties required to create and process an auto insurance claim. Since the system has Police department registered within the service, it locates ID for the Police Officer 611 responsible for the dealing with the claims. Owner 631 notifies Police Officer by typing his message (a conversation fragment) and inserting pictures (conversation fragments) of his burglarized car into Conversation 680. The system is configured to send the conversation fragments to the police officer as well as the entire Police team 610.

Police Records clerk 612 becomes a party to the conversation as a member of the police team. He adds Records Service to the conversation and requests a police report number, which is entered into the conversation.

Since car burglary is not a violent crime, the police officer is not required to attend the scene in person. He adds Surveillance Service 613 to the conversation and queries it for street snapshots within the time interval of the crime. After matching time and location of the accident, Surveillance Service 613 discovers several videos from street cameras that capture the moment of the crime and extract snapshots from them. The service adds the snapshots (conversation fragments) to Conversation 680.

In the meantime, the system adds Insurance team to Conversation 680. Using an interactive process, it asks the user for his policy number, and other identifying information. Using the information the system locates registered Insurance Agent 621 responsible for processing claims and adds him to the conversation. By the virtue of being added to the conversation, the agent is notified of the accident. He also receives information provided by the user, police, and witness.

The system asks the agent to fill in the default roles of Claim Adjustor 622, Claim Service 623, and Wallet Service 624. Having located registered persons (human and artificial) within the system, the agent adds them to the conversation.

Claim Service 623 interacts with Owner 631 to gather information about the accident and verify coverage information. Because it knows that Police team 610 and Witness 640 are parties to Conversation 680, it requests and receives information from them within the same conversation. Information exchanges may occur in real time and/or asynchronously, depending on availability of persons involved.

Once the information necessary for submitting an insurance claim is ready, Claim Service 623 notifies Claim Adjustor 622, so that she begins claim valuation process.

In the meantime, Owner 631 adds his Wife 632 and his Lawyer 633 to the conversation. He instructs the system that his wife is an active participant, while his lawyer is a passive participant. As the result, Wife 632 receives all conversation fragments by default, while Lawyer 633 will receive them only when Owner 631 instructs the system to share Conversation 680 (or any of its fragments) explicitly.

Because the owner has an important meeting, he asks his wife to contact a repair shop. Wife 632 knows Mechanic 651. She finds him within the system and adds him to the conversation. Prompted by the system, she designates the repair shop where he is employed as Auto Repair Shop team 650.

The system contacts the shop. Since Mechanic 651 is not available for messages, Receptionist 653 interacts with the system to respond to the invitation to join the conversation. She also adds Shop Owner 652, who instructs his staff to tow the car and gives them location information contained in the conversation.

Once the car is delivered to the shop, Shop Owner 652 creates a detailed estimate for repairs and adds it to the conversation, directing it at Adjustor 622, Owner 631.

When the adjustor doesn't reply within a day, Wife 632 uses the conversation to alert Insurance Agent 621 to the delay. As the result, Adjustor 622 contacts Receptionist 653 to schedule a visit to the shop to verify the estimate.

Once the visit is complete and estimate verified, Adjustor validates the estimate using Conversation 680. The system notifies Insurance Agent 621 and Claims Service 623. Insurance Agent completes the claim process by instructing Wallet Service 624 to transfer money to Wallet Service 654 that belongs to the auto repair shop. In one implementation he sends the instructions as a text fragment in the body of the conversation. In another implementation he drags and drops the amount due on the claim from an icon representing his Wallet Service to an icon representing the shop's Wallet Service. The icons are located on his portable device and displayed next to Conversation Stream 690.

Car Owner 631 monitors the transactions using the conversation system. He asks Shop Owner 653 to instruct Mechanic 651 to fix the car. When the car is ready, Mechanic 651 takes its pictures, adds them to the conversation, and notifies the owner. Owner 631 arranges with Receptionist 653 to pick up the car.

As the result of the process, all parties have access to copies of all documents and transactions. Instead of using various means of communications, such as e-mail, phone, web, personal interactions, they rely on the conversation system to provide an efficient medium for gathering information for the claim, processing the claim, transferring funds, and making sure that the car is fixed.

To make the system even more efficient, the system is enabled to use reminder, calendar, auditing and other automated services. The services are configured to generate reminders if conversation parties are not responsive to certain conversation fragments. That is, internal exchanges within a conversation can be timed, so that automatic reminders are sent.

For example, when Owner 631 sends a message to Insurance Agent 621, he attaches a conditional reminder service timer that generates a repeat if Agent 621 doesn't reply within 24 hrs.

In another example, an automated auditing service asks Owner 631 for feedback on the entire transaction and its parties. The owner rates various aspects of the transaction. The service is enabled to evaluate objective information, such as claim processing or auto repair duration, and combine it with subjective feedback supplied by the user. As a result, the system is enabled to compare performance of different parties within the same set of scenarios. It can use the information to suggest a higher rated team (car repair shop, insurance adjustor, etc.) during the initial stages of a particular scenario. The system is also enabled to provide information to employers of each team to rate their performance for internal purposes, e.g. promotions, pay raises, recommendations, etc.

Figure 7:
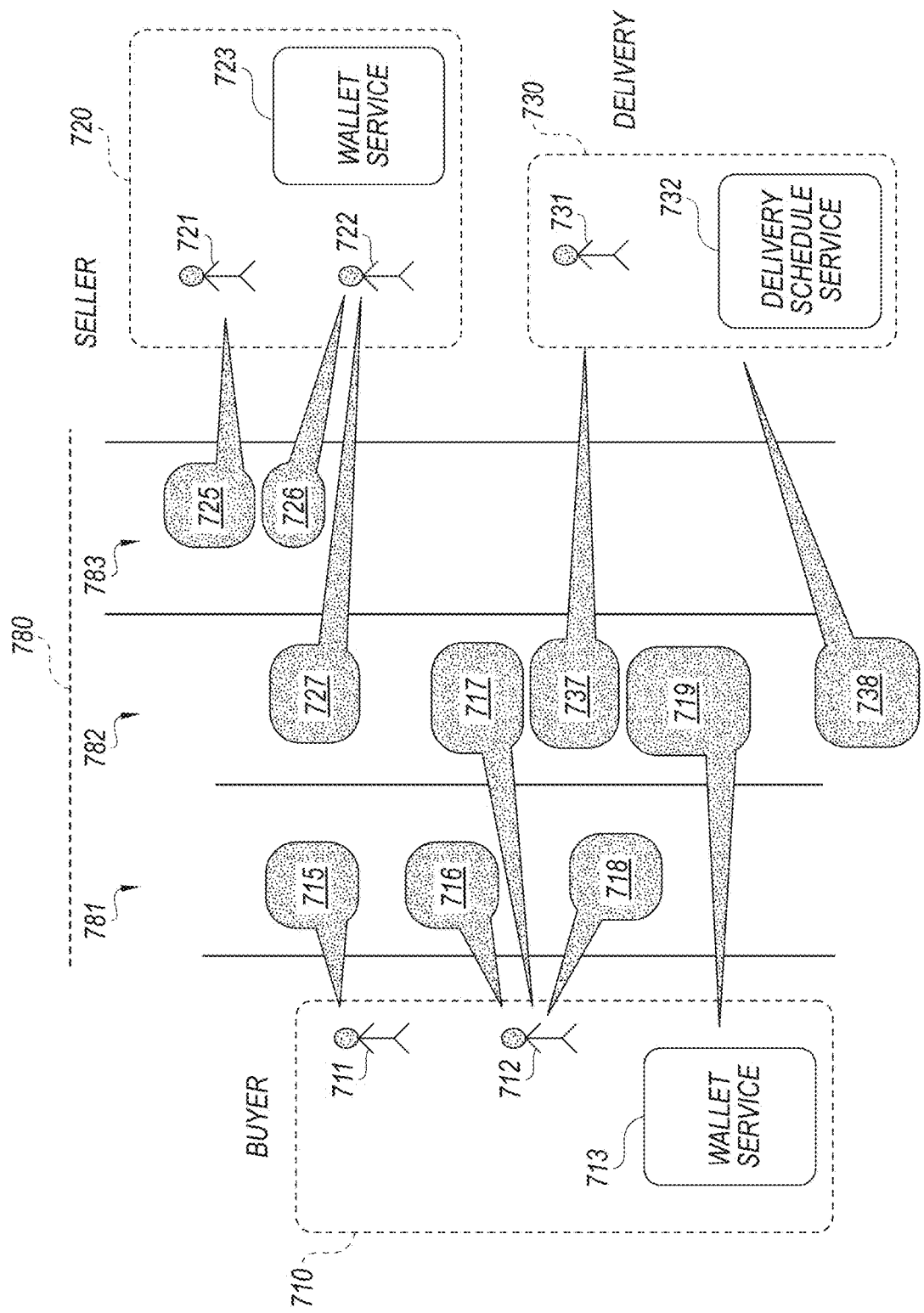
FIG. 7 illustrates a product purchase and delivery scenario enabled by the system of the disclosed technology.

FIG. 7 illustrates a product purchase and deliver scenario user scenario enabled by the system of the disclosed technology.

The scenario involves three teams, Buyer 710, Seller 720, and Delivery 730. The teams interact using Conversation 780.

Buyer team 710 comprises human Buyer agents 711, 712, and automated Wallet Service 713.

Seller team 720 comprises human Seller agents 721, 722, and automated Wallet Service 723.

Conversation is configured to have multiple sub-conversations, 781, 782, and 783. Buyer team uses sub-conversation 781 to exchange confidential messages; Seller team uses sub-conversation 783 for their own confidential messages; all teams use sub-conversation 782 for joint messages (conversation fragments).

Delivery team 730 comprises human Delivery agent 731 and automated Deliver Schedule Service 732.

In one example, the seller team specializes in customized kitchen cabinets. Seller agents are physically located at different locations: agent 721 is at the store, agent 722 at the manufacturing site. Agent 721 creates open Conversation 780 that indicates to prospective buyers that the store is open for business. Agent 721 registers the conversation with the system of the disclosed technology. After exchanging private messages 725 and 726, agent 722 places an invitation to make an offer in the public domain of the system via sub-conversation 782.

The buyer team discovers the offer by searching the system for kitchen cabinets. Initially, Buyer agent 711 uses her mobile phone to browse available deals. When she locates a suitable offer, she makes agent 712 a member of her team and, after exchanging with him messages 715 and 716, she transfers the conversation to the large screen digital TV in their living room. Both teams exchange messages (not shown) that include pricing, technical, graphical, video, and other information to negotiate the offer. All messages are a part of the same Conversation 780, but split into different sub-conversations to avoid confusion among the parties and allow for private discussions of various aspects of the offer.

Finally, agent 712 makes an acceptable offer 718. He adds their Wallet Service 713 to the conversation. Seller Team accepts the offer (not shown) and adds Delivery Team 730 to Conversation 780, allowing it to interact only through the public sub-conversation 782.

Delivery Agent 731 suggests (737) a possible delivery schedule, which agent 712 accepts. After that, Wallet Service 713 is instructed to transfer money (719) to Wallet Service 723.

Automated Deliver Schedule Service 732 finalizes the schedule using sub-conversation 782. Since all parties are enabled to monitor the sub-conversations they participate in the process ensuring that the service has information what product packages, when, how, at which price, at what time, at which location, with what notification options, are going to be delivered to the buyers. If necessary, sellers 721 and 722 participate in the conversation to complete the transaction.

The system enables Seller team 720 to create a separate private sub-conversation with its subcontractors to negotiate various aspects of the transaction. In one example, they use the sub-conversation to discuss technical aspects. In another example, they use the sub-conversation to distribute money among the participants. In a yet another example, they use the sub-conversation to discuss customer complaints when scheduled delivery doesn't take place on time or has other discrepancies from the original agreement. In one more example, a transaction manager discusses with a team member multiple customer transactions, e.g. related to a particular service stage in a complex service process.

In some implementations, the system enables Buyer team 710 to divide money between the parties in the public sub-conversation 782. For example, they are enabled to allocate tips per team member or between different sub-contractors, depending on the level of service provided.

The system enables efficient transactions because it covers end-to-end conversations associated with the order. All teams are enabled to review the conversation at a later time. The system also monitors open conversations and eliminates "dropped call" situations, e.g. when a conversation is terminated due to a communication failure.

For example, the supervisor of the seller team 720 may evaluate negotiation tactics used by the team. In another example, the supervisor may request and receive aggregated parameters from multiple buyer teams to see how much conversation time and effort it takes to negotiate a transaction with a particular seller team. That is, since all sub-conversations belong to the same conversation or associated with, e.g. by a service patter, the system enables statistical analysis of transactions across multiple buyers, sellers, and their sub-contractors. The supervisor may use the information to create a high-level control dashboard to monitor transactions using interactive graphical interfaces across different teams, locations, types of products, etc. The supervisor is also enabled to add team members and/or incentives if she concludes that the conversation is not proceeding well.

The conversation records can be used for customer support, dispute resolution, product returns, re-negotiations, repeat purchases, incentive offers, training sessions, sub-contractor performance reviews, etc.

User interfaces in the system are enabled to browse (e.g. using scroll interface on a multi-touch display with a "swipe" gesture) each sub-conversation synchronously or separately. For example, when agent 711 wants to review her private conversations with agent 712, she can independently go back over sub-conversation 781 without affecting the representation of sub-conversation 782, either on her own device or on everybody else's device. In one implementation, to enable a broader view of the conversation, the interface displays multiple threads and scrolling options when the user turns it, e.g. from portrait to landscape mode. To facilitate conversation, the interface may present various default and/or custom "aboutness" fields, e.g. product name, product ID, customer IDs, service step, service instance, etc.

Figure 8:
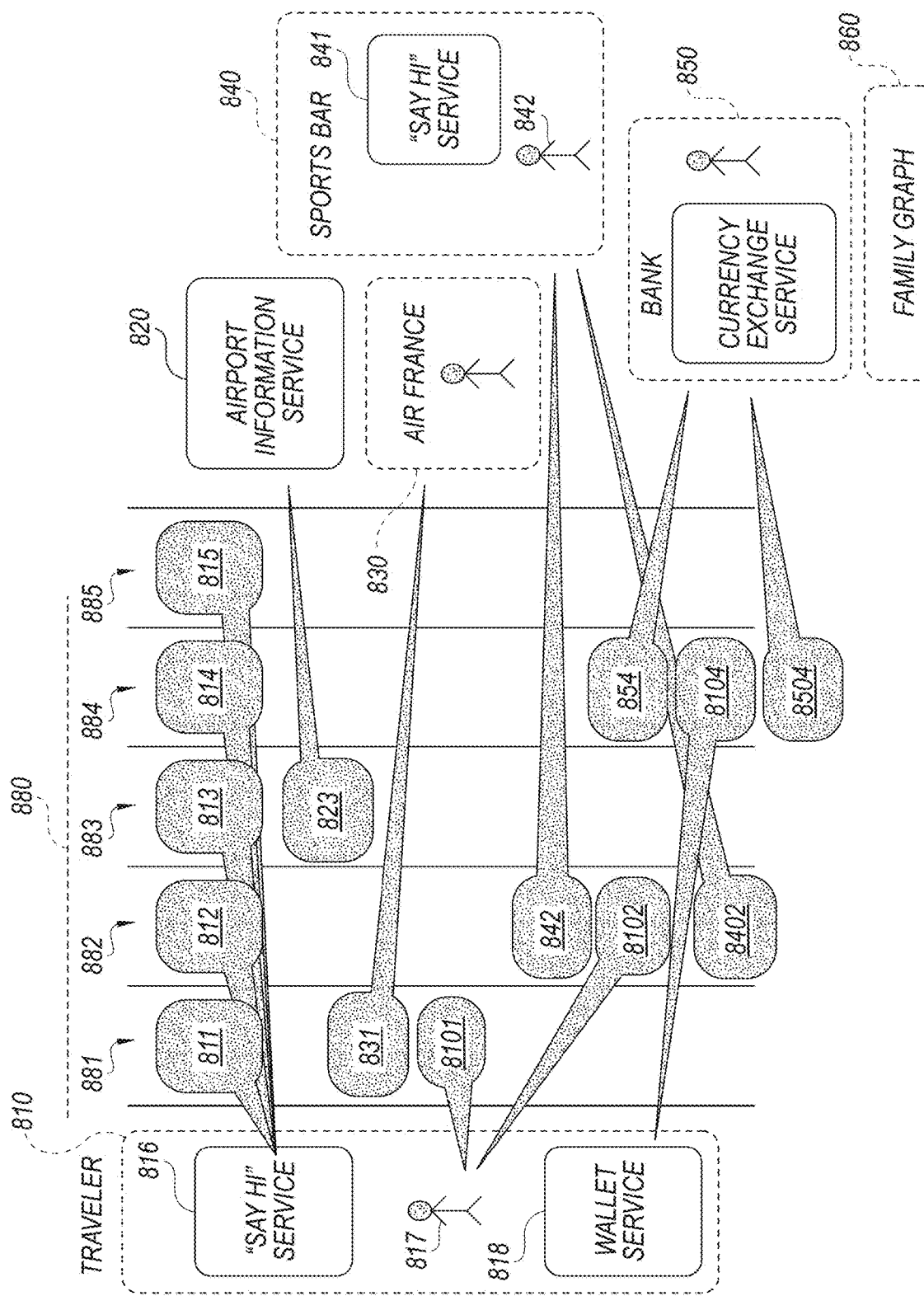
FIG. 8 illustrates an airport arrival user scenario enabled by the system of the disclosed technology.

FIG. 8 illustrates an airport arrival user scenario enabled by the system of the disclosed technology.

According to the scenario, traveler 817 flies for the first time from San Francisco airport (SFO) to Paris Charles De Gaulle airport (CDG). Upon arrival, the traveler starts his mobile application that serves as an interface to the conversation system. He activates the Say Hi scenario for the airport, by hitting "Say Hi" soft button on the device. The system creates a new composite conversation 880, comprising 5 independent sub-conversations (881 through 885).

By default, the system creates a team 810 for the traveler, adding instances of "Say hi" 816 and Wallet 818 services. In one implementation, the system detects popular businesses at the location. In another implementation, the system is pre-configured with certain business instances by the user before the flight. In a yet another implementation, the system adds teams in an interactive mode, asking the traveler whether he wants to connect.

Say Hi Service 816 generates default messages (811 through 815) directed at the selected teams.

First, Airport Information Service 820 or a virtual concierge replies with a welcome message 823 containing an airport map, border and customs notes, and locations of restrooms, restaurants and major duty-free stores. If desired, the user can initiate a conversation (Say Hi) with any of the restaurants or stores. In one implementation, the message is customized with the traveler's language, age, gender, other explicitly or implicitly expressed general preferences. In another implementation, the system communicates to service 820 the traveler's system ID, which the service uses to obtain his travel preferences from a remote database. In a yet another implementation, the traveler picks specific questions from a menu suggested by his Say Hi service 816. In one more implementation, a third party (not shown) guides the user in selecting, asking, and replying to messages from Airport Info Service 820. This interactive mode is implemented using either sub-conversation 816 or a different sub-conversation. Service 820 is enabled to offer incentives, such as coupons and discounts, which can be transferred between different sub-conversations, e.g. by dragging and dropping them on the application user interface. The system is enabled to analyze effectiveness of incentives, provide feedback to the service providers, and adjust them to improve effectiveness. In some implementations, Service 820 invokes a pre-defined scenario and connects relevant business services from one or more brands.

Second, an Air France customer service representative 830 replies with message 831 placed into sub-conversation 881. In this scenario, the traveler's initial message 811 contained his frequent flyer information; therefore, message 831 contains connecting gate and time data. The traveler is enabled to interact with the service and he replies with question 8101. Other message exchanges may take place within the sub-conversation (not shown). In one implementation, Say Hi service sends traveler's system ID, which allows representative 830 to locate the traveler's frequent flyer information and other personal data allowed to be shared in this scenario. The representative is enabled to customize her messages, similar to the customization options described earlier.

The user is enabled to authorize or de-authorize a specific person and/or team to access personal information. The authorization can be applied at different levels: team, relationship, conversation, and/or conversation fragment.

The user is also enabled to review his/her authorizations.

Third, an automated message 842 from "Say Hi" service 841 arrives. It contains default information about Sports Bar team 840; the information includes location, menu, and popular game schedule for the next two hours. Service 841 is a 24×7 part of the Sports Bar team. It is configured to reply to standard "Say Hi" requests in languages preferred by the travelers. Most travelers contact the bar using their conversation app rather than the more traditional web interface.

Traveler 811 replies with message 8102, asking to reserve a spot in front of the big TV in 30 minutes. Since the automated service 841 can't understand the message, it is routed to waiter 842, who replies with message 8402, confirming the reservation.

Fourth, a reply message 854 from Bank team 850 arrives to sub-conversation 884. The message contains foreign exchange information. The traveler uses his Wallet Service 818 to exchange money certificate 8104. The Bank's Currency Exchange Service replies with message 8504 confirming the exchange. The message represents a receipt that can be moved to the traveler's expense report conversation (not shown) started when his manager authorized the trip. The user interface of the application supports drag-and-drop, hold-and-search (e.g. using a pop-up menu), and other types of interactions for conversation navigation.

As discussed in FIG. 5 description, the system is enabled to increment successful interaction counts, so that the next time the traveler arrives to the airport his conversations are automatically connected to preferred teams/individuals/services.

In some implementations, the system keeps track of user interactions and suggests teams/individuals/services with high connection levels across users of a certain demographic group or other type of group or personal preferences.

No reply comes from Family Graph team 860. The team represents a segment of the traveler's extended family that lives in Paris. The system forms the team based on the traveler's information submitted in his preferences, imported through social networks, email, and other mechanisms. Unfortunately for the traveler, nobody among his distant relatives is online. Since he doesn't know them personally, or is not aware of their plans, message 815 is sent to the entire virtual team.

In other scenarios, the traveler is enabled to browse Family Graph before the flight and identify individuals that he would like to contact upon arrival. Based on his preferences, message 815 can be sent to specific selected individuals, or the entire graph. Similarly, the traveler can send a Say Hi message to his social or business graph or a combination of any members of both.

As discussed above, user interface allows the traveler to interact with each sub-conversation independently. Also, he has an option of joining or splitting sub-conversations. For example, he joins sub-conversations 881 and 881 to discuss with the airline and bar waiter whether he has enough time to for a glass of wine before the connecting flight.

The traveler is also enabled to transfer money from his Wallet Service 818 to the Sports Bar team 840 via Bank 850.

Figure 9:
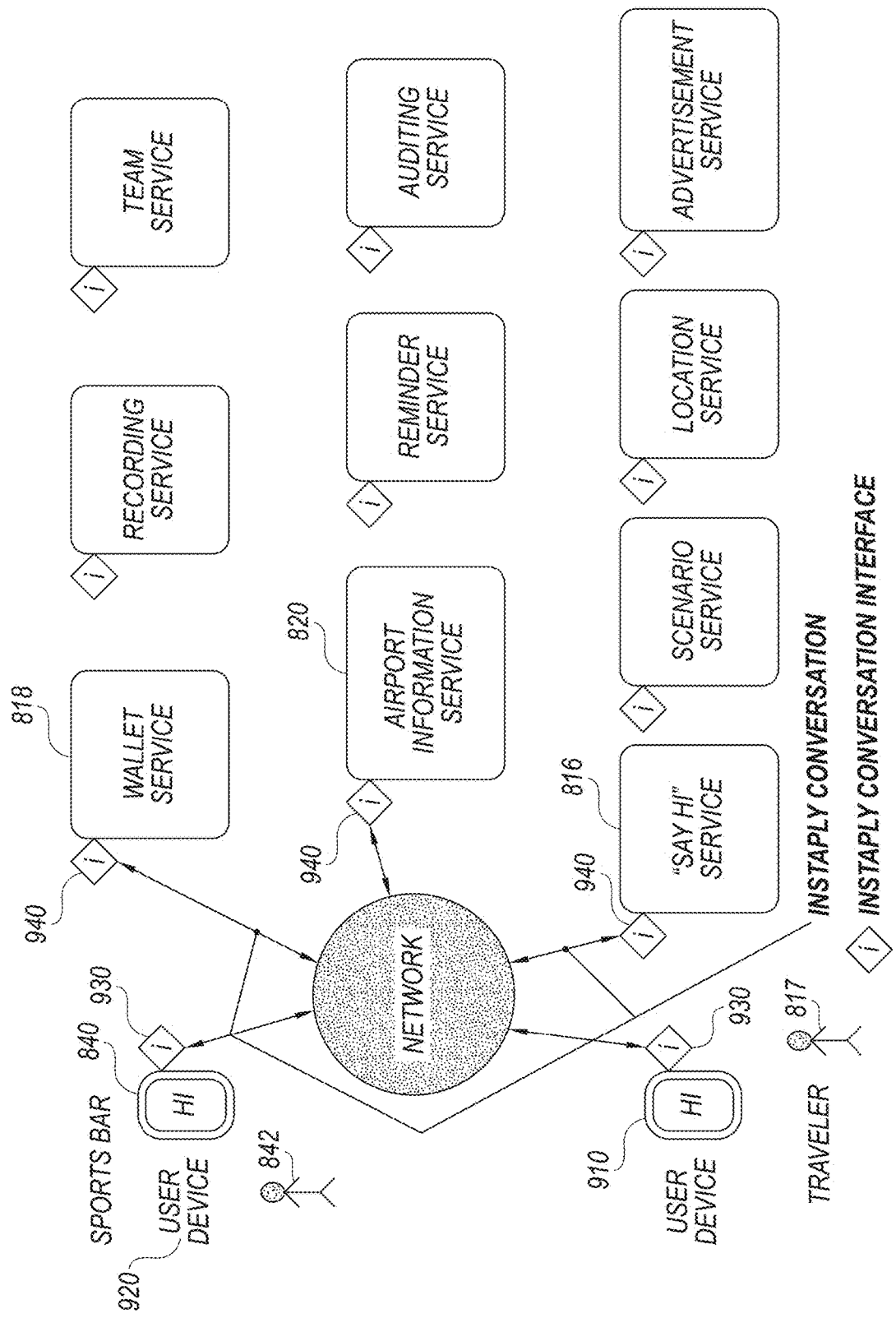
FIG. 9 illustrates interactions between devices and services within the system of the disclosed technology.

FIG. 9 illustrates interaction between devices and services within the system of the disclosed technology.

Traveler 817 has a mobile user device 910, which is enabled to interact with the rest of the devices and services in the system using client interface 930, which is responsible for attaching the device to the rest of the system. The interface supports system APIs necessary for transferring data from the user device to the rest of the system. An application hosted by the device uses the APIs to communicate, e.g., user ID, conversation ID, conversation fragments, network ID (e.g. IP and/or MAC addresses) and other information relevant to the interaction. For example, the application may initialize with user ID when the traveler logs onto the system. When the traveler starts a new conversation the application requests and receives a conversation ID, e.g., using Instantiate Blank process 360, which is associated with the traveler and his device. The application is enabled to store conversation IDs for a certain number of recent and/or open conversations, depending on the amount of memory available on the device. The application is also enabled to receive a conversation fragment using a conversation ID. In some implementations, the application is enabled to receive a conversation ID as a result of a search of a subset of user conversations, e.g. by text, names of other users, team composition, pictures, videos, time interval, etc. The application is also enabled to get team composition (graph) using a conversation ID.

Bar waiter 842 also has a communication device 920 with system interface 940. Device 920 interacts with the rest of the system in a manner very similar to device 910. Because the device belongs to a business, in some implementations it is allowed to interact with the system over a secure channel only. In other implementations, it is required to do a two-factor user authentication. In another implementation, it is enabled to use network and software interfaces with different levels of security requirements. For example, when user 842 participates in one conversation as a consumer and in another conversation as a member of a business team, the latter conversation is required to go over a secure channel. Furthermore, waiter 842 is enabled to see and select a business team member, e.g. a sub-contractor, based on the sub-contractor reputation, pricing, real-time or delayed bids, user preferences, etc.

Services 816, 818, 820 and others interact with the system using instances of Service Interface 940. The interface enables conversion of internal representations of service information to conversation format. For example, Airport Information Service 820 has information in HTML format. When interacting with the system of the disclosed technology it uses interface 940 to convert it to text format. In another example, Wallet Service 818 uses interface 940 to encrypt currency values before transferring it between different user and business team accounts.

FIG. 9 illustrates other types of services that are enabled to interact with the system of the disclosed technology. For example, Recording Service is added to the conversation to record interactions, either complete or partial, between parties in the conversation. Team Services keeps track of team composition and communications between team members. Reminder Service can be added to the conversation to send/receive/forward timed messages (conversation fragments) to conversation parties. Auditing Service is added to the conversation to keep track of value transactions and produce receipts. Scenario Service provides users with standard and customized scenarios for conversations. Location Service provides location, either physical or virtual, information to the conversation.

Figure 10:
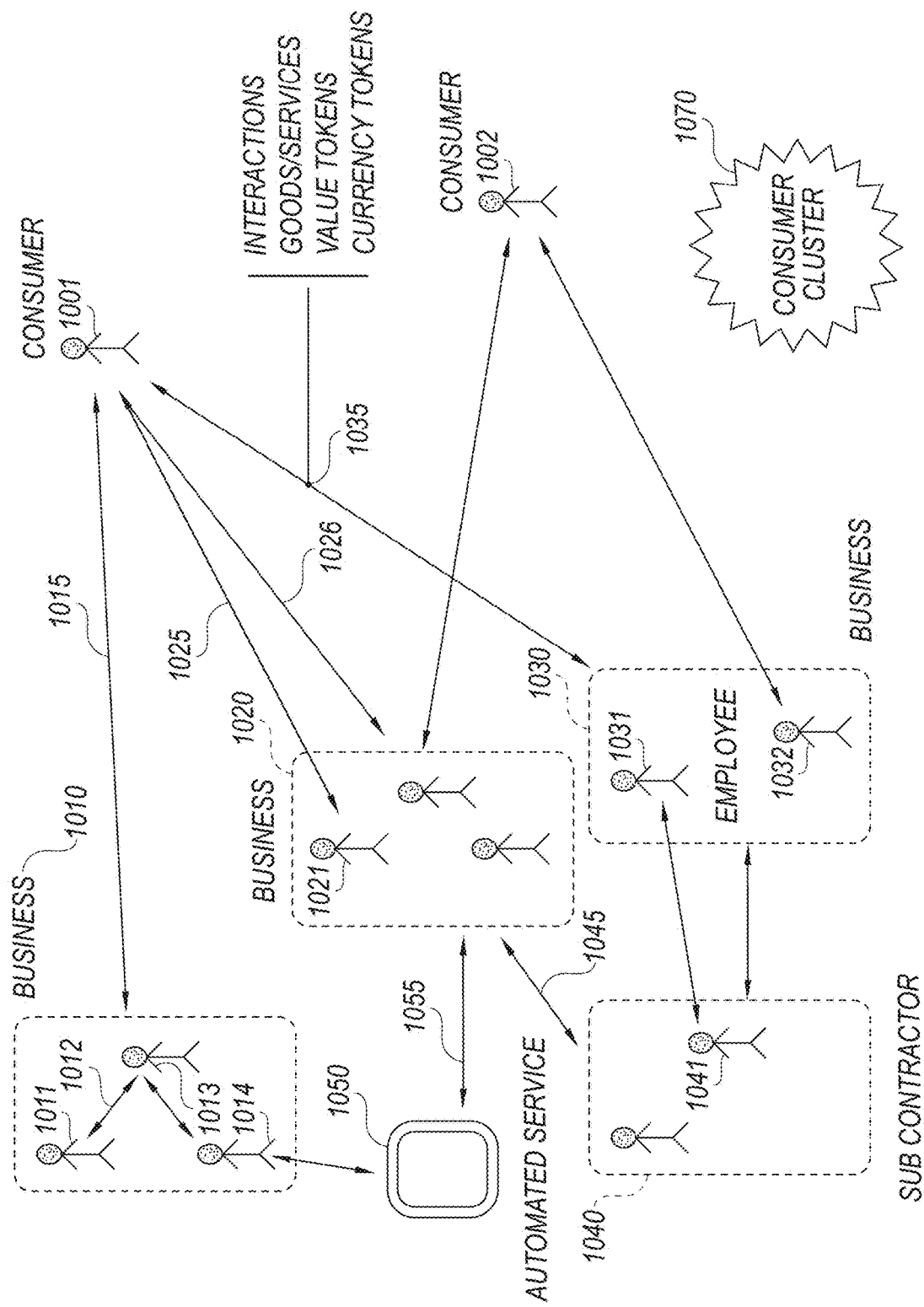
FIG. 10 illustrates a business graph enabled by the system of the disclosed technology.

Other services can be easily added to the system for originating, capturing, processing, augmenting, adding, and manipulating conversation fragments based on user, team, business, security, location, and other meta-information. In one embodiment, each fragment is assigned at least one semantic type, such as text, time, picture, money, etc. The interface uses the type to convert the fragment to its service's internal data type and back FIG. 10 illustrates a business graph enabled by the system of the disclosed technology. The business graph captures information between conversation participants. For example, Consumer 1001 has a connection with Business team 1010. That is, the consumer doesn't know any of the team members (1011 . . . 1013) personally, but uses the business to discuss and buy goods from it. For example, the user may contact a take-out burger restaurant to order food using the system of the disclosed technology. Receptionist 1013 discusses the order with the customer and her team (e.g. sub-conversation 1012). To fulfill the order team member 1014 interacts with automated delivery service 1050.

In some scenarios, team 1010 is formed on a per-project basis. Nevertheless, the conversation contains contact information of the team members, so that any one or all of them can be contacted in the future, e.g. with customer complaints, project review, and other messages.

In other scenarios, team 1010 represents a formal organization, e.g. a sales department, customer support group, university faculty, etc.

In FIG. 10, conversations are represented by two-way arrows, e.g. 1015, 1025, 1026, 1035, 1045, 1055. Conversations may include, but not limited to digital interactions, transfer of goods and services, value tokens, currency tokens, as well as other types of consideration. Interactions may include representations about products, services, user preferences, and various states of affairs in the system. Interaction may also include directives, i.e. instructions from conversation participants to perform certain actions, such as value transfers, product transfers, orders, etc. Interactions may include comissive statements, such as promises, offers, and others. Interactions may also include expressive statements, such as complaints, thanks, apologies, etc. In addition, Interactions may include declarations, such as appointments, announcements, joint agreements, etc.

In the food order example above, Business team 1010 provides representations of plates and drinks on the menu. Consumer 1001 describes his preferences, asks for advice, and places orders. He also promises a payment, and thanks for the prompt service. Business team members can also place orders, e.g., to Sub-contractor 1045 and/or third party service 1050. They can promise transfer of currency and/or value tokens, e.g. coupons, loyalty points, etc.

In another example, Consumer 1001 interacts with Business 1020, e.g. insurance agency. He knows Employee 1021 personally and contacts him directly via connection 1025. As the conversation progresses, the consumer has to transfer money in return for a payment at a later date, e.g. for medical services from a third party. Although the relationship between the consumer and the employee is personal, the promise of payment 1026 is between the consumer and Business 1020. Both interactions (1025 and 1026) can be a part of the same conversation. The conversation can involve other employees of Business 1020.

By contrast, Consumer 1002 has only business relationship with team 1020. Nevertheless, he can proceed to create a conversation. In the process of the conversation he can establish a personal working relationship and next time contact a specific team member directly. When a specific employee leaves his/her team, the relationship remains with the team. A replacement employee is enabled to access the relationship and evaluate its characteristics.

Similarly, employees may or may not have direct, individual relationships with other employees. Nevertheless, they can do business with teams by locating them, e.g. by search, directory, or reference from other conversation participants. For example, relationship 1045 between business 1020 and sub-contractor 1040 is impersonal.

In another example, business Employee 1031 and Sub-contractor employee 1041 have a personal working relationship. When Consumer 1002 interacts with business 1030, which requires services of Sub Contractor 1040, Employee gets involved to facilitate the conversation. The involvement is implemented, e.g. by adding the employee to the conversation, either privately within his team or so that the consumer can see the employee's involvement. Various mechanisms to involve multiple parties in a conversation are discussed above, e.g. in relationship to FIG. 7.

Characteristics of a connection are stored in a memory, e.g. database service (not shown). Such characteristics may include absolute values, e.g. number of conversations between parties, number (volume) of product/service items transacted, amount of value tokens transferred, amount of currency payments transferred. In other implementations, characteristics include relative values, e.g. ratio between currency value of transactions and number of conversations; average of conversation fragments per conversation; ratio of goods/services per conversation, etc. The system is enabled to provide information and evaluate employee and/or team performance based on connection characteristics.

Similarly, a consumer in the system can be characterized by his/her connections, e.g. by automatically assigning priority conversations with higher ratios of currency value to a business. For example, when consumers 1001 and 1002 initiate conversation with business 1020, consumer 1001 is given a preference because he has a personal connection with employee 1021. Alternatively, the system may assign a higher priority to a new customer, e.g. because the connection with the existing customer has a value ratio below threshold. The system may identify consumers with high level of experience and include them in conversations when business team members are not available to provide advice, e.g. outside the office hours. Such consumers can be treated as virtual team members and provided with incentives to answer questions and transact with other consumers on behalf of the team.

In some implementations, connections are evaluated statistically over a population in at least one of the categories of employees, teams, businesses, organizations, consumers, etc. For example, Consumer Cluster 1070 is created by aggregating consumers using a calculated value of expected ratio of money spent per conversation. The cluster can be created and/or adjusted by evaluating connections between consumers in a third party social graph, e.g. Facebook, LinkedIn, Twitter, Google+ and other social networks.

In some implementations, external relationships are mapped to internal relationship and user identities ("friends") presented as internal and/or transparent for creating and exchanging messages.

Figure 11:
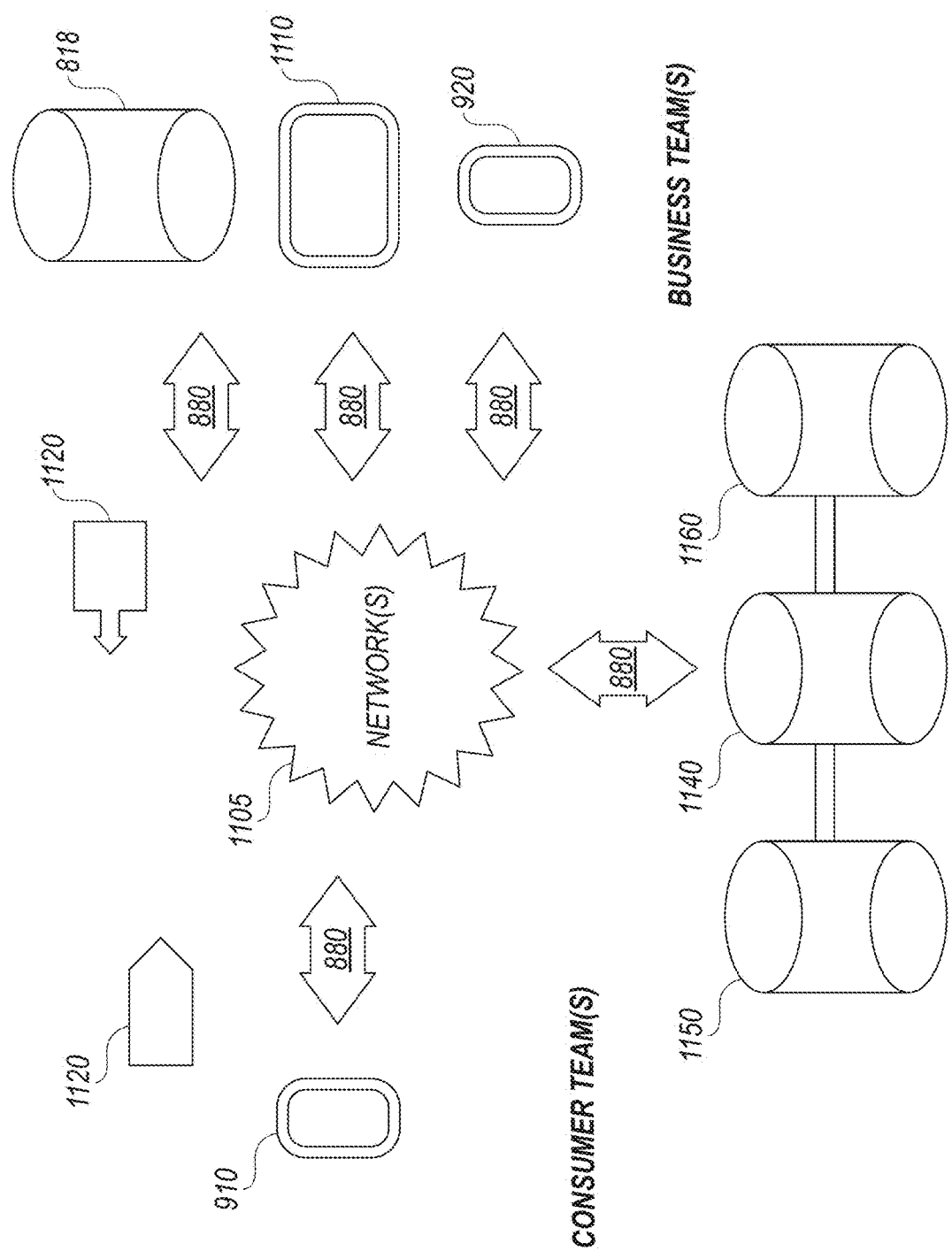
FIG. 11 illustrates a distributed network of goods, services, conversations, considerations and other transactions enabled by the system of the disclosed technology.

FIG. 11 illustrates a distributed network of goods, services, conversations, considerations and other transactions enabled by the system of the disclosed technology.

User device 910 (see FIG. 9 discussion for more detail) initiates conversation 880 (see FIG. 8 discussion for more detail). Examples of user device include a smartphone, personal area network accessory such Google Glass, tablet, PC, laptop, Point-of-Sale terminal, TV, Set Top Box (STB), game console, GPS device, HVAC control panel, etc.

Conversation goes over Network 1105, e.g. the Internet and/or internal company network.

Fragments of the conversation 880 go another user device 920, tablet 1110, and data center 818, associated with a Wallet Service. Devices 920, 1110, and 818 are members of the same team, members of which can exchange conversations between themselves.

At the same time Conversation 880 is copied to memory 1140, which is associated with conversation evaluation service 1150 that computes and/or statistically predicts conversation ratios.

In some implementations, tablet 1110 belongs to a team supervisor who also has access to service 1150. The access is provided on a subscription or pay-per-use basis. The supervisor evaluates this and other conversations using a visual dashboard on tablet 1110 that shows performance of the team, e.g. measured in value generated and/or consumer satisfaction measurements received.

Conversation 880 results in an agreement. According to the agreement business sends goods 1120 to the user, while the user sends consideration, e.g. money, to the business. The consideration is directed to Service 818 and credited to the team. In some implementations, the user is enabled to divide the consideration between team members. For example, when giving a tip after a meal at a restaurant, the user allocates money between the cook, waiter, and kitchen staff.

To avoid bank fees, such as currency conversion, users are enabled to use internal credits in lieu of consideration and exchange the credits into preferred currency if necessary.

Service 1160 is used for discovery and routing conversations between users in the system. It contains real-time as well as historical information about the network; personal preferences and device configurations time of conversation. The service can be used for pre-configured standard scenarios, e.g. involved in secure conversations.

Figure 12:
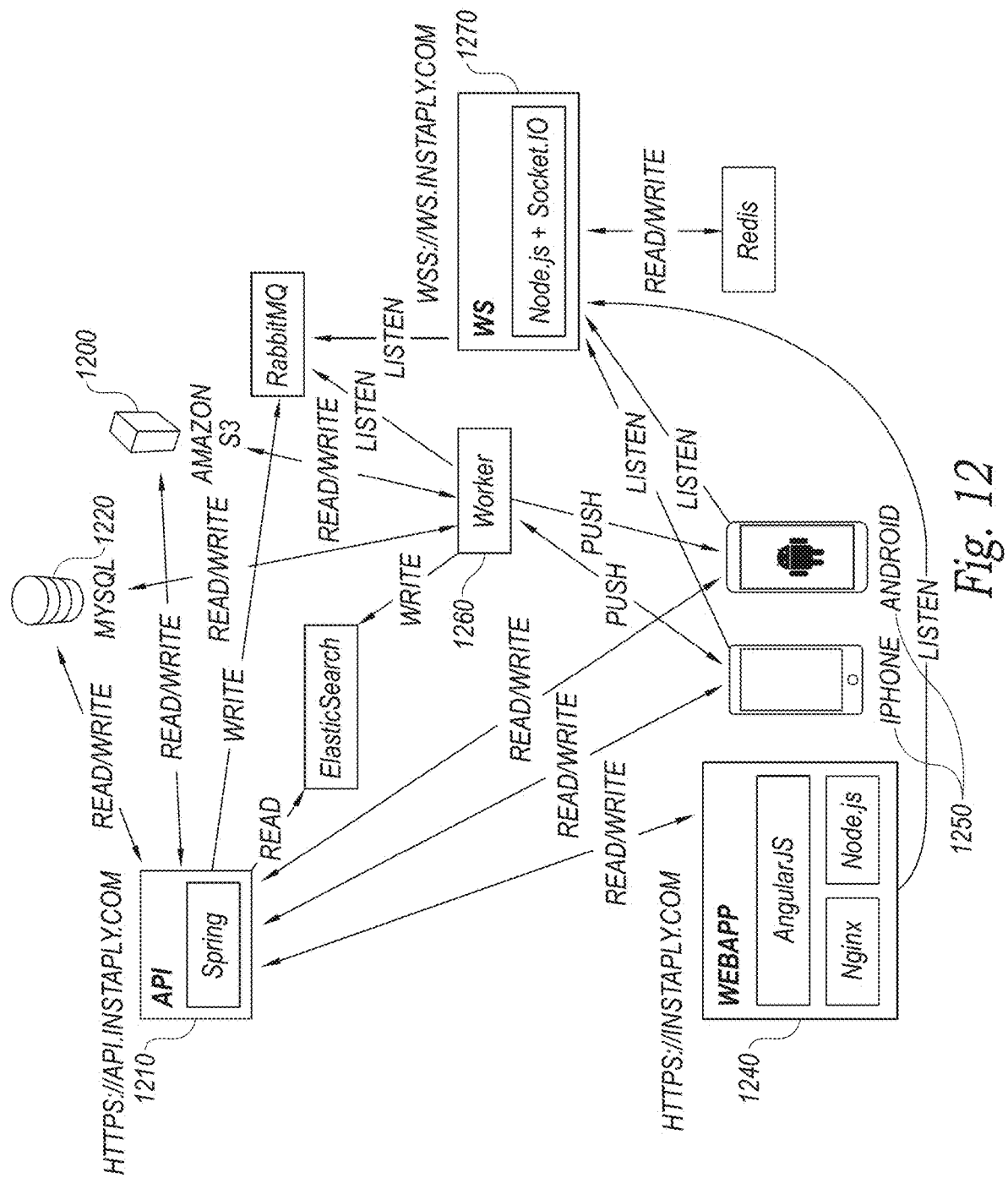
FIG. 12 is a diagram of a computer-enabled system that implements a conversation record keeping system in accordance with one embodiment of the disclosed technology.

FIG. 12 provides an example of a computer-enabled implementation of the disclosed technology. In one embodiment, a host server 1200 (that may be operated by a third party such as Amazon.com) runs a software program 1210 that stores records of communications between participants as conversations. The software program presents an API that allows users and third party systems/programs to provide fragments of conversations or (if allowed) to receive records of conversations. Records of conversations, the participants, attachments such as photographs, documents etc. and rules for who have access to the conversation are stored in a database 1220.

Users access a conversation using their personal computing device such a PC, laptop, gaming console, in-car computer system etc. 1240 or their personal smart phone 1250. Communications about a conversation can be sent directly to the hosting server through the API 1210. If another participant performs some task related to a conversation in which the user is involved, worker software 1260 operated by the server 1200 detects the communication and provides a notification to the user's computing device 1240, 1250.

A web application 1270 monitors communications from a user's or a conversation participant's computing device. If the communication is directed to a conversation, the web application notifies a messaging broker application such as RabbitMQ from Pivotal that allows communications to be sent and received from different applications. Documents, photographs, consideration etc. for a transaction that is the subject of a conversation can be sent between participants and messages confirming the transmission and receipt of such items are stored in the database 1220.

The software program 1210 also interfaces with the wallet exchange program (not shown) that is associated with conversation participants. In this manner, the software program 1210 confirms the transfer of consideration between participants in order to detect if a transaction has been completed and to keep records of a transaction.

In some cases, supervisors can access the database 1220 with their own computing device (not shown) to determine how a transaction and/or a number of transactions with selected using a business criteria are progressing. Such supervisors could be managers of a sales team, physicians monitoring their patients and nurses, insurance claim adjusters etc. A user can leave feedback regarding a conversation that is stored in the database and used by the supervisor to rate its sales team or improve future service.

If a user wishes to purchase a particular hardware item, a new conversation can be started between the user and an employee at a hardware store. The store is copied on the message and a supervisor can forward the message to another employee if the original employee is no longer working at the store. Records of the interactions that make up the conversation are stored on the database 1220. The user can complete a transaction from their computing device 1240, 1250 to initiate the transfer of consideration from their account to the hardware store using their wallet exchange. A record of the consideration transfer is kept on the database for return/exchange purposes. A supervisor, either human or implemented as an auditing service, can inspect all the transactions from a particular store to determine the effectiveness of its sales team, to spot trends in consumer purchases, sub-contractor performance, etc.

Once a user is registered with the system, the application 1210 keeps a record of an identification number for the user's computing device 1240, 1250 and messages to the user for a new or existing conversation are sent to the address of the computing device. The identification number can be a unique number assigned by the system or provided through a third party, e.g. a phone number, a social networking ID, government issued ID, block chain computation function, etc.

The computing device is able to display the conversations by subject or other identifier so that the user is able to view all portions of a conversation as well as the underlying documents. In some cases, the database 1220 keeps track of items that need to be completed in order to finalize a transaction. For example, in home ownership a buyer may want to pre-qualify for a mortgage. Several papers are required to be provided to the bank in order to pre-qualify and the database can keep track of what papers have been provided and which are still outstanding. Other aspects of a home purchase such as an earnest money check, inspection sign off etc. can be shown to the participants so that the participants can easily view what steps are left to complete.

The checklist of documents required can be pre-determined based on the type of transaction that the user wants to complete. In addition, participants in the conversation may be able to add or subtract from the list of documents required based on the particular circumstances of the matter at hand.

On the user's computing device, communications to another conversation participant include an ID or other code that identifies the particular conversation. The ID or code is read by the web application 1270 to route the communication to the appropriate participants and to store a record of the communication in the database 1220. The user's computing device produces a user interface that lists individual conversations that the user is involved in or has completed. Be selecting a particular conversation, the computing device retrieves communications stored for that conversation. In addition, documents for the transaction associated with the conversation can also be retrieved or viewed as well as any checklist of items to be completed. The user interface allows a user to invite additional people or services into a conversation and to set rules for how much of the conversation the new participant is able to see.

Examples of Coordinating Products and Services for Customers

As described herein, a service provider, which coordinates transactions and conversations between customers and sub-contractors, may perform various actions to assist the sub-contractors with providing products and services that fulfill goals requested by customers to the service provider (via a communication platform of the service provider).

Figure 13:
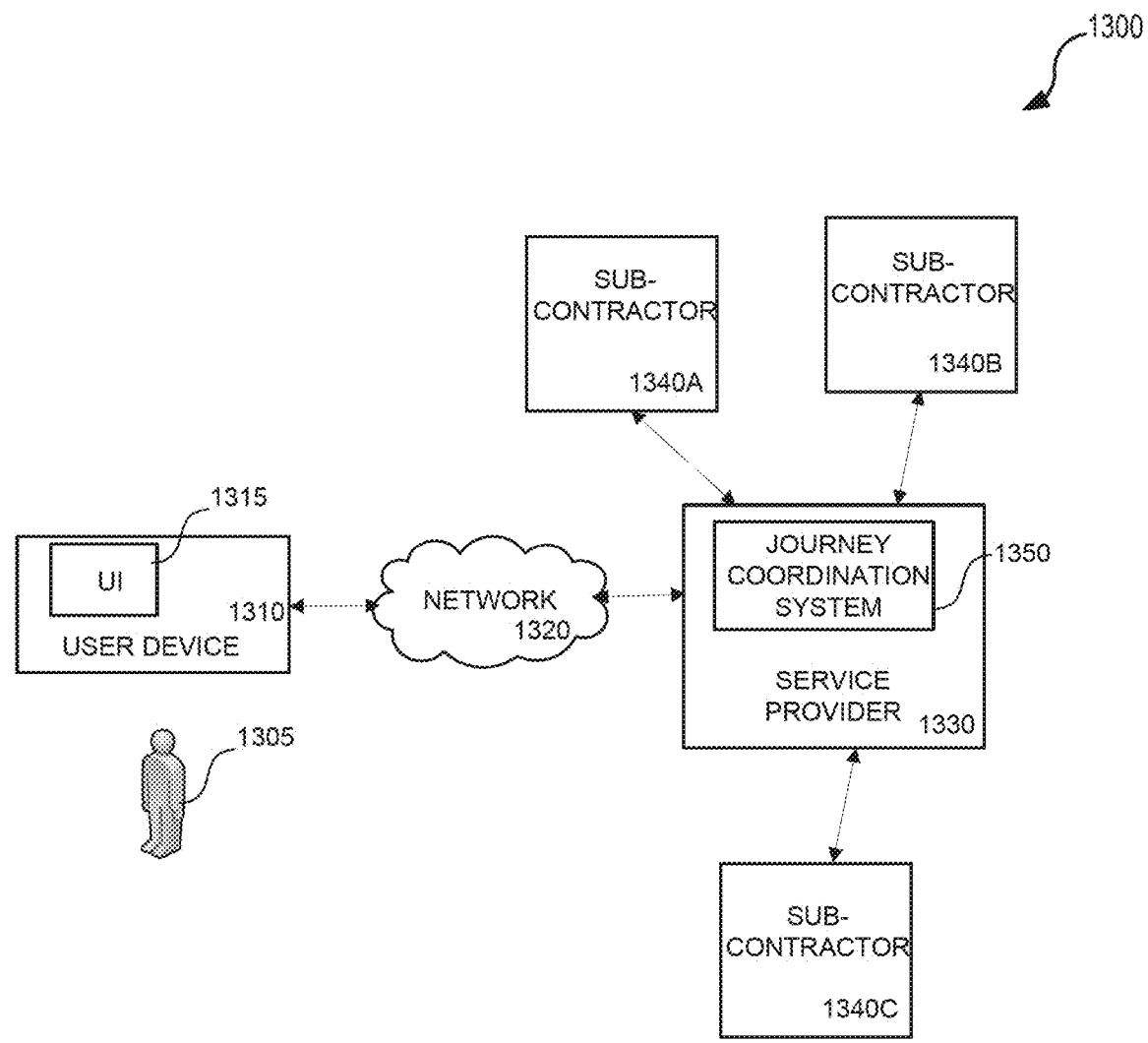
FIG. 13 is a block diagram illustrating a suitable computing environment in which to coordinate sub-contractor services for a customer.

FIG. 13 is a block diagram illustrating a suitable computing environment 1300 in which to coordinate sub-contractor services for a customer. A customer 1305, via his/her user device 1310 (e.g., mobile device, tablet, laptop, smart glasses, VR headset, personal area network (PAN), smart watch or other peripheral, and so on), may access the communication platform 1330 of the service provider over a network 1320, such as the Internet. As described herein (e.g., with respect to FIG. 10), the platform 1330 of the service provider coordinates interactions between the user device 1310, such as via a user interface 1315 of the user device 1310, and one of more sub-contractors 1340A-C, such as various companies, entities, other service providers, retailers, and so on.

In some embodiments, the platform 1330 of the service provider includes a journey coordination system 1350 that is configured to manage exchanges of information between the customer 1305, the user device 1310, the service provider 1330, and the various sub-contractors 1340A-C.

Figure 14:
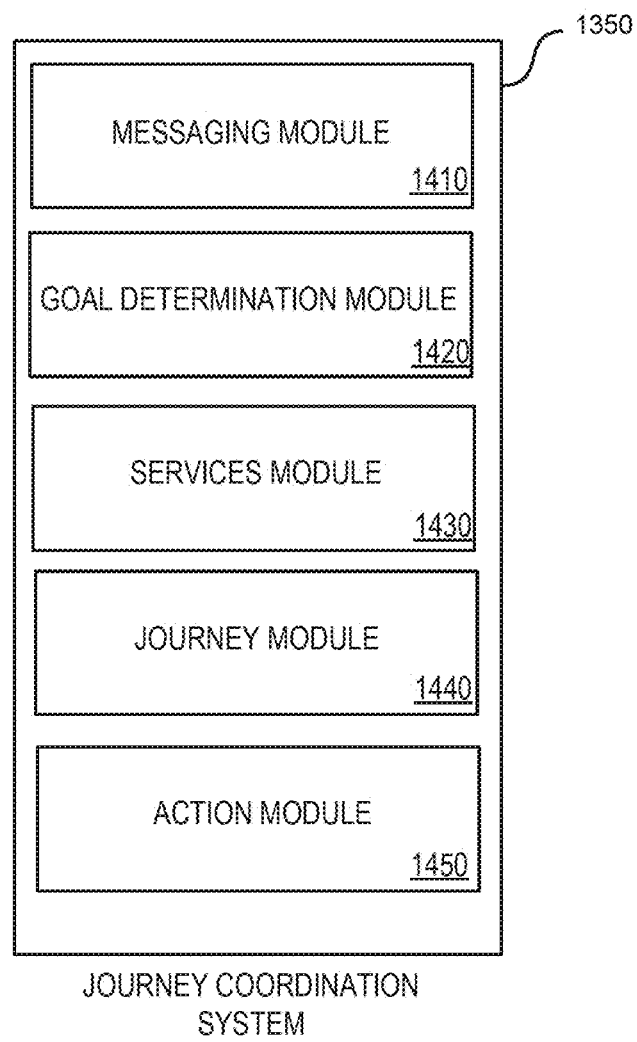
FIG. 14 is a block diagram illustrating components of a journey coordination system.

FIG. 14 is a block diagram illustrating components of the journey coordination system 1350. The journey coordination system 1350 may include one or more modules and/or components to perform one or more operations of the journey coordination system 1350. The modules may be hardware, software, or a combination of hardware and software, and may be executed by one or more processors. For example, the journey coordination system 1350 may include a messaging module 1410, a goal determination module 1420, a services module 1430, a journey module 1440, and an action module 1450.

In some embodiments, the messaging module 1410 is configured and/or programmed to access a message, or multiple messages, from a customer of a service provider. The messages may include content representing a request from the customer to provide one or more services that combine to fulfill a goal. The message may include a request for one or more services, that, when combined, fulfill a goal.

For example, the message may be received by the platform 1330 of the service provider, and may include content identifying all services associated with the goal, such as a selection of content from a pre-defined menu (e.g., "Hamilton Package"), and/or from user input, (e.g., "Get me tickets to the Broadway show "Hamilton," as well as transportation to the show, and reservations for dinner afterwards").

As another example, the message may be received by a web service associated with providing tickets to the Broadway show (e.g., a subcontractor), associated with the platform 1330 of the service provider—e.g., "I want two tickets to Hamilton for Friday, Orchestra seats."

Thus, the messaging module 1410 may access a message sent by the customer 1310 to a customer support system of the service provider (via platform 1330) and/or may access a message sent by the customer to a customer support system of one of the identified sub-contractors (and managed or associated with platform 1330).

In some embodiments, the goal determination module 1420 is configured and/or programmed to determine the goal based on the content of the message. For example, the goal determination module 1420 may extract a goal from the contents of a message, such as based on one or more words within the message that match to previous goals fulfilled by the platform 1330, or based on keywords within the message (e.g., the message "I want to go see Hamilton," may indicate a goal of getting tickets and transportation to the Broadway play).

In some embodiments, the services module 1430 is configured and/or programmed to identify one or more sub-contractors capable of providing the one or more of the services that combine to fulfill the goal. For example, the services module 1430 may identify web services, retailers, other service providers, and so on, capable of providing services and/or products associated with fulfilling various aspects of the goal. The services module 1430 may also prioritize sub-contractors based on their customer satisfaction track record, contract arrangement, pricing policies, user preferences, and other quality assurance or metrics associated with their previous performances or current prices/policies.

The services module 1430 may, in some embodiments, access records of conversations and/or transactions stored in database 1220, and identify sub-contractors, information associated with the sub-contractors, active or previous goals or transactions associated with the sub-contractors, and so on. For example, the services module 1430 selects an online ticketing web service as the sub-contractor 1340A to provide tickets to the Broadway show (a product), and selects an online transportation network company as the sub-contractor 1340B to provide transportation to/from the show (a service).

In some embodiments, the journey module 1440 is configured and/or programmed to determine a journey of actions to be performed with respect to the identified sub-contractors to fulfill the goal. The journey module 1440 may determine a journey of engaging with multiple sub-contractors 1330A-C, either in series or in parallel, that, when combined, will provide services and products to the customer that complete the request goal.

As described herein, the journey module 1440 may build or utilize a graph of paths between connected nodes, each of which represent a service or product provided by the sub-contractors 1330A-C. For example, the journey module 1440 may build or access a graph of paths connected to one another by nodes, wherein each of the paths represents a service provided by a subcontractor, and wherein an unbroken connection of paths between a beginning node and one or more ending nodes represents a journey to a goal, and select a journey within the graph that connects the beginning node to the goal.

Figure 15A:
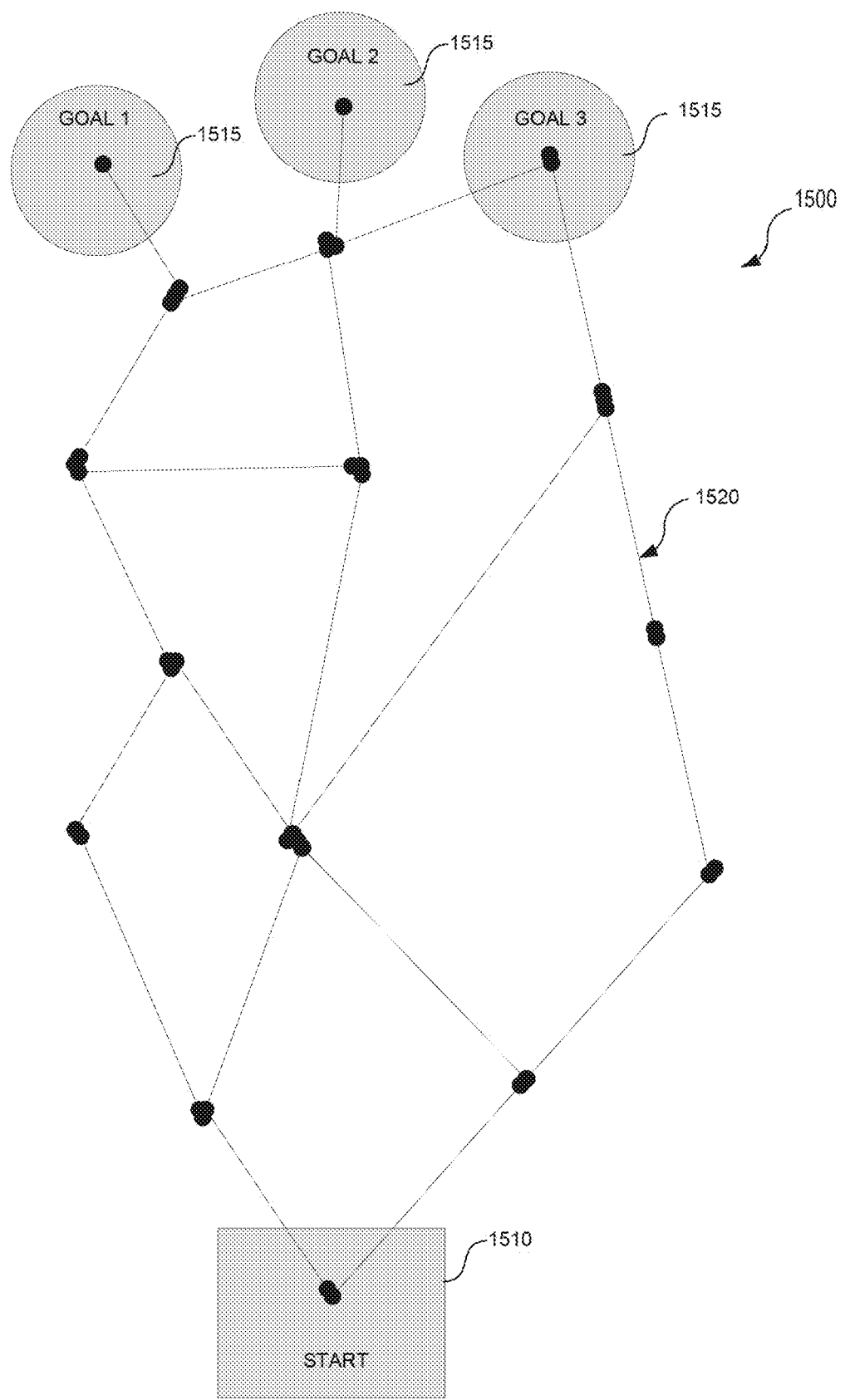
FIGS. 15A-C are graphs that illustrate various action journeys performed on behalf of a customer.
Figure 15B:
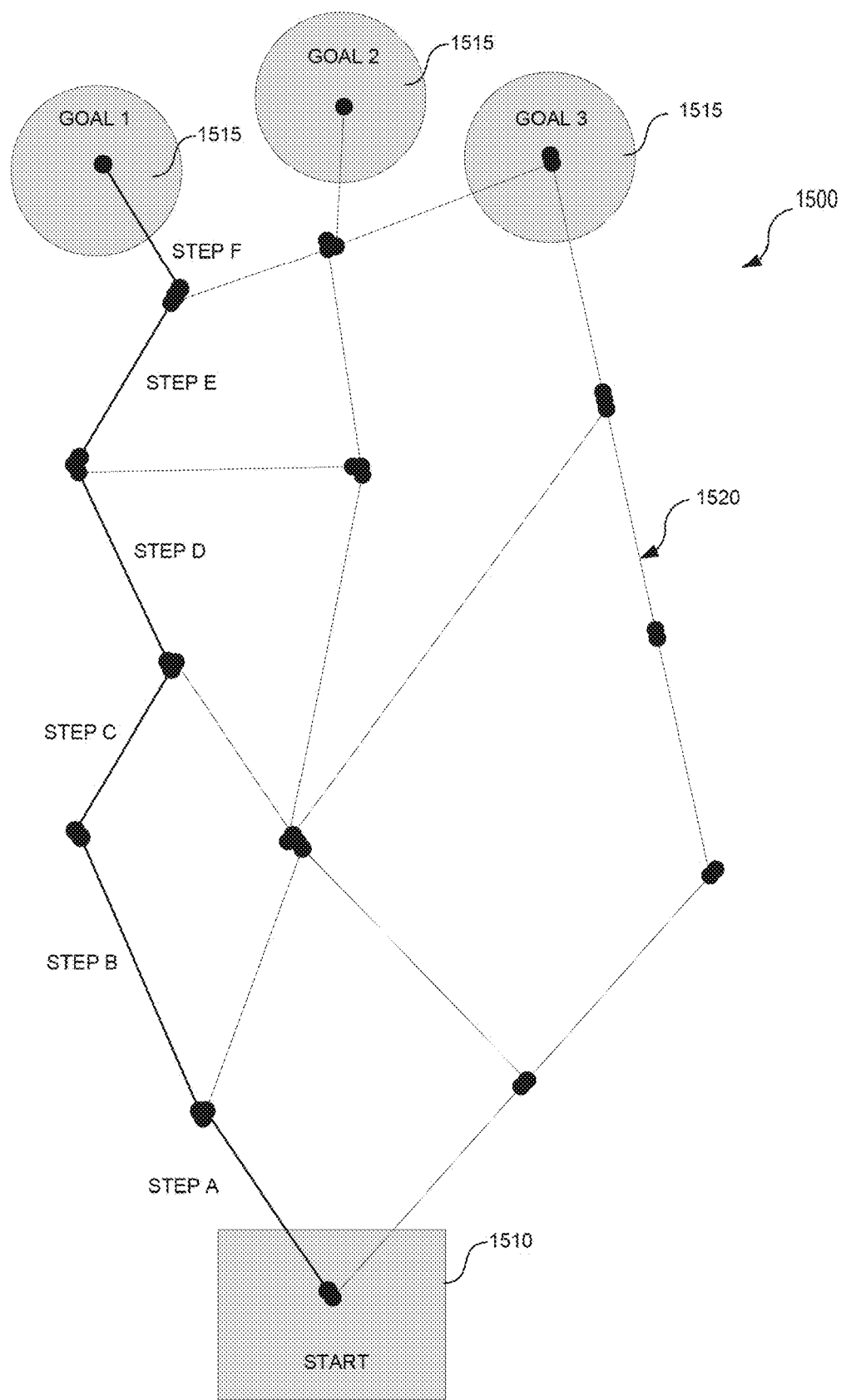
Figure 15C:
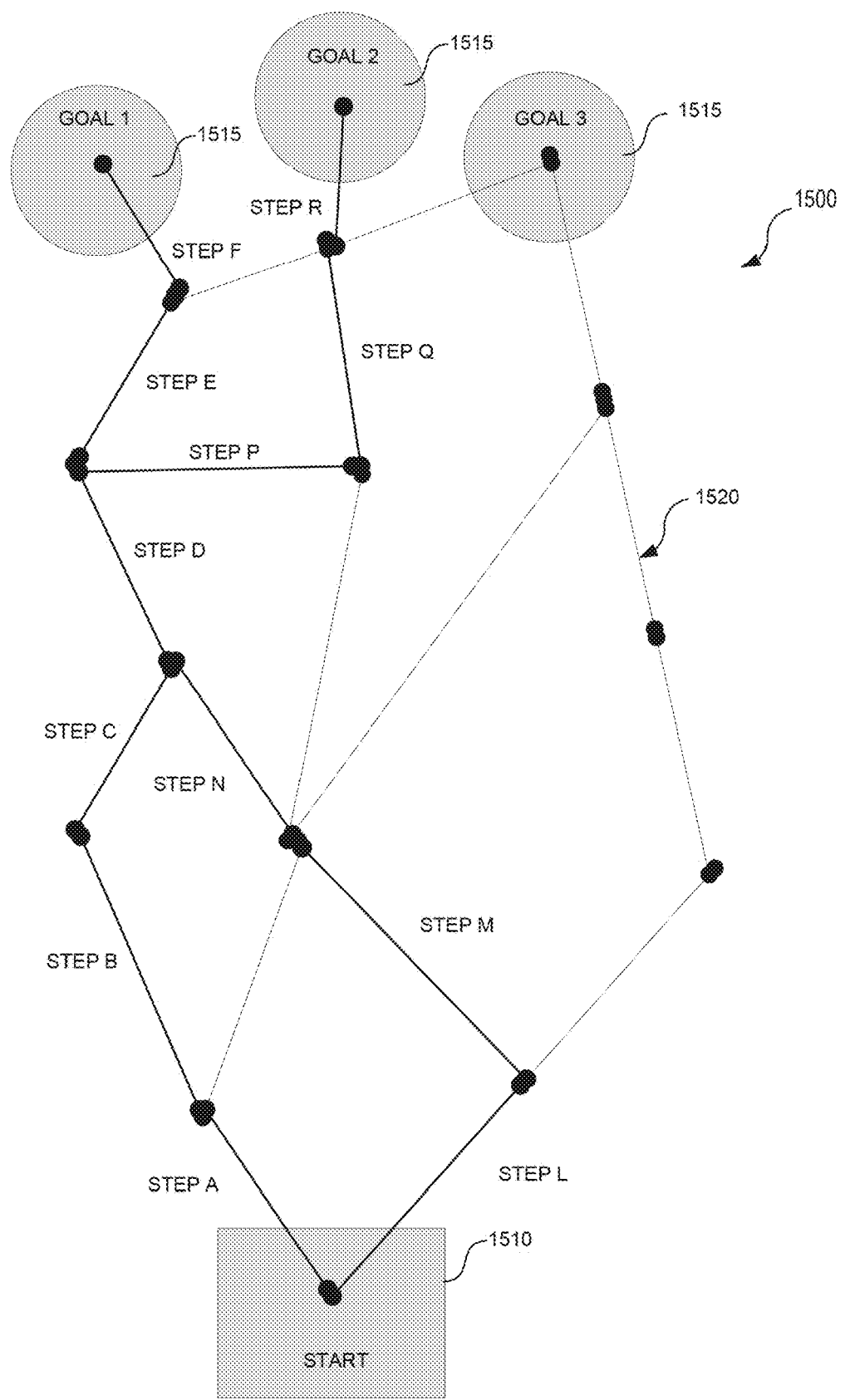

The journey module 1440 may select one or more journeys to accomplish or fulfill a goal based on constraints applied to the goal, such as time, budget, sub-contractor reliability, or other similar constraints. FIGS. 15A-C are graphs that illustrate various journeys performed on behalf of a customer, and/or by a customer or potential customer to obtain, fulfill, or accomplish a requested goal.

FIG. 15A depicts a graph 1500 of nodes, including a beginning or entry node 1510 (although other nodes may also be entry nodes), paths 1520 between nodes that represent services or products (or, actions performed by the platform 1330 of the service provider with respect to the services or products) that fulfill the goal, and one or more goal nodes 1515.

FIG. 15B depicts an example journey through the graph 1500 to a goal 1515. The example journey includes the connected paths 1520 of STEP A, STEP B, STEP C, STEP D, STEP E, and STEP F. Each of the paths 1520 represents an action to be performed with respect to a sub-contractor. For example, given the example goal described herein that is based on the message of "Get me tickets to the Broadway show "Hamilton," as well as transportation to the show, and reservations for dinner afterwards, the example journey may include the following actions to be performed:

STEPS A or B—facilitate purchase of tickets for Hamilton by sending a message to the user that includes a link to purchase tickets at ticketing web service (sub-contractor);

STEPS C or D—schedule car service to pick up customer at a certain time before show, and provide payment to car service via the car service's mobile application;

STEPS E or F—make reservation at restaurant near address of show via an online reservation web service; and so on.

FIG. 15C depicts an alternative example journey through the graph 1500 to the goal 1515, which includes one or more paths shared by the journey depicted in FIG. 15B. The alternative journey includes the connected paths 1420 of STEP L, STEP M, STEP N, STEP D (the shared path), STEP P, STEP Q, and STEP R. In some cases, each step includes one or more message exchanges between the service provider and the sub-contractors.

Of course, the journey module 1440 may utilize other graphs or tools when identifying a suitable or optimized group of sub-contractors through which products and services are procured to satisfy a requested goal.

Referring back to FIG. 14, in some embodiments, the action module 1450 is configured and/or programmed to perform the actions within the selected journey of actions. For example, the action module 1450 may perform one or more actions (as described herein) to facilitate completion of a transaction between the customer and one of the identified sub-contractors, to facilitate an exchange of information between the customer and multiple identified sub-contractors, to provide information about a service provided by a first sub-contractor to a second sub-contractor providing a service that is complementary to the service provided by the first sub-contractor, and so on.

Figure 16:
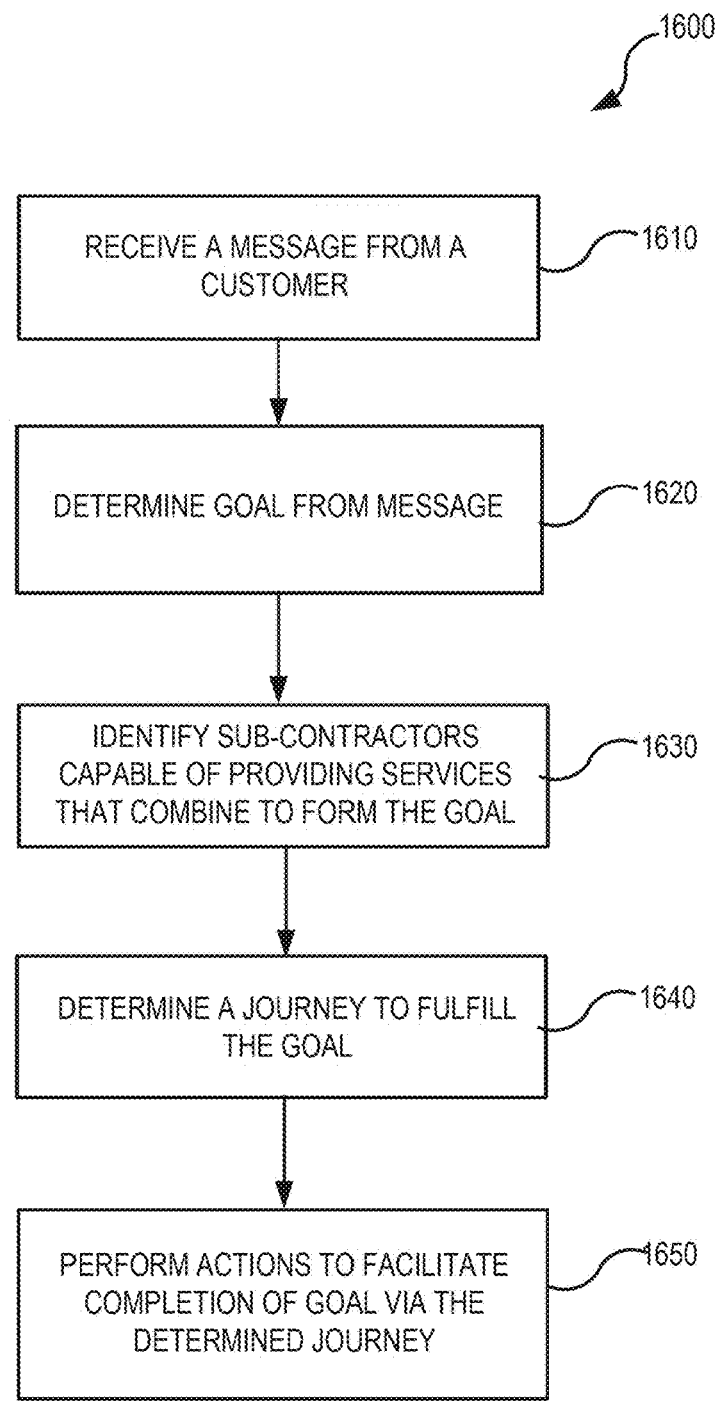
FIG. 16 is a flow diagram illustrating a method for coordinating services performed for a customer.

Thus, as described herein, the journey coordination system 1350 may perform various algorithmic processes or methods when coordinating actions performed to obtain services and products to satisfy a requested goal. FIG. 16 is a flow diagram illustrating a method 1600 for coordinating services performed for a customer. The method 1600 may be performed by the journey coordination system 1350 and, accordingly, is described herein merely by way of reference thereto. It will be appreciated that the method 1600 may be performed on any suitable hardware.

In operation 1610, the journey coordination system 1350 receives or otherwise accesses one or more messages between a customer and a service provider, wherein the one or more messages include content representing a request from the customer to provide one or more services that combine to fulfill a goal. For example, the messaging module 1410 may access a message sent by the customer 1310 to a customer support system of the service provider (via platform 1330) and/or may access a message sent by the customer to a customer support system of one of the identified sub-contractors (and managed or associated with platform 1330).

In operation 1620, the journey coordination system 1350 determines the goal based on the content of the message. For example, the goal determination module 1420 may extract a goal from the contents of a message, such as based on one or more words within the message that match to previous goals fulfilled by the platform 1330, or based on keywords within the message.

In operation 1630, the journey coordination system 1350 identifies one or more sub-contractors capable of providing the one or more of the services that combine to fulfill the goal. For example, the services module 1430 may access records of conversations and/or transactions stored in database 1220, and identify sub-contractors, information associated with the sub-contractors, active or previous goals or transactions associated with the sub-contractors, and so on.

Figure 17:
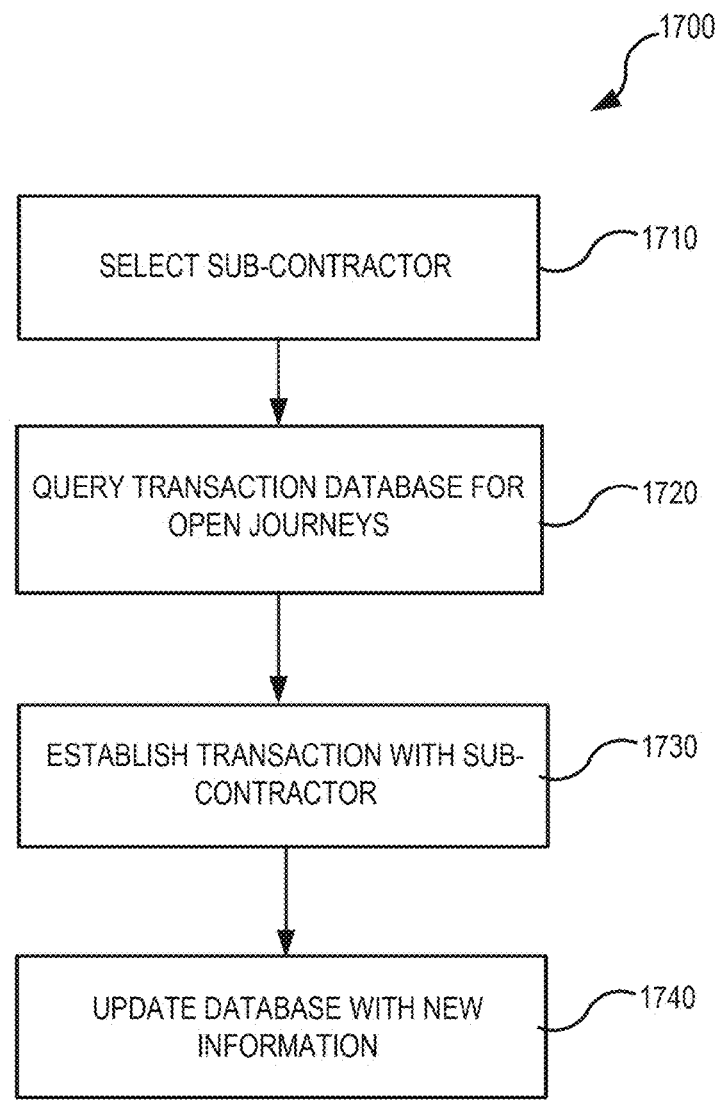
FIG. 17 is a flow diagram illustrating a method for modifying a conversation associated with a customer based on interactions with a sub-contractor.

In some cases, the services module 1220 may provide information from other conversations that are associated with an identified sub-contractor, and modify the conversations after utilizing the sub-contractor for the journey. FIG. 17 is a flow diagram illustrating a method 1700 for modifying a conversation associated with a customer based on interactions with a sub-contractor. The method 1700 may be performed by the journey coordination system 1350 and, accordingly, is described herein merely by way of reference thereto. It will be appreciated that the method 1700 may be performed on any suitable hardware.

In operation 1710, the journey coordination system 1350 selects a sub-contractor. For example, the journey coordination system 1350 may select a sub-contractor based on an automated triage procedure (e.g., based on multiple similar requests across disparate journeys, based on exchanging messages via a mobile application, based on communicating using a voice to text interface, based on feedback from the customer, and so on.

In operation 1720, the journey coordination system 1350 queries a transaction database 1220 for information about active or open journeys that include the sub-contractor (e.g., web services that provide services within active journeys. For example, the journey coordination system 1350 may attempt to identify whether to escalate or minimize actions to be performed with respect to the sub-contractor, whether to perform a group request, and so on.

In operation 1730, the journey coordination system 1350 establishes a conversation with the sub-contractor, and in operation 1740, updates the database 1220 with the new conversation information.

Returning back to FIG. 16, in operation 1640, the journey coordination system 1350 determines a journey of actions to be performed with respect to the identified sub-contractors to fulfill the goal. For example, the journey module 1430 may build or generate a graph of paths connected to one another by nodes, wherein each of the paths represents a service provided by a subcontractor, and wherein an unbroken connection of paths between a beginning node and one or more ending nodes represents a journey to a goal, and select a journey within the graph that connects the beginning node to the goal based on one or more constraints (e.g., time or cost) applied to the goal.

In operation 1650, the journey coordination system 1350 performs the actions within the selected journey of actions. For example, the action module 1450 may perform one or more actions (as described herein) to facilitate completion of a transaction between the customer and one of the identified sub-contractors, to facilitate an exchange of information between the customer and multiple identified sub-contractors, to provide information about a service provided by a first sub-contractor to a second sub-contractor providing a service that is complementary to the service provided by the first sub-contractor, and so on.

As described herein, the journey coordination system 1350 may facilitate multiple transactions between a service provider and a sub-contractor, such as multiple transactions (e.g., disparate or similar actions) associated with multiple, different, customers of the service provider.

Figure 18:
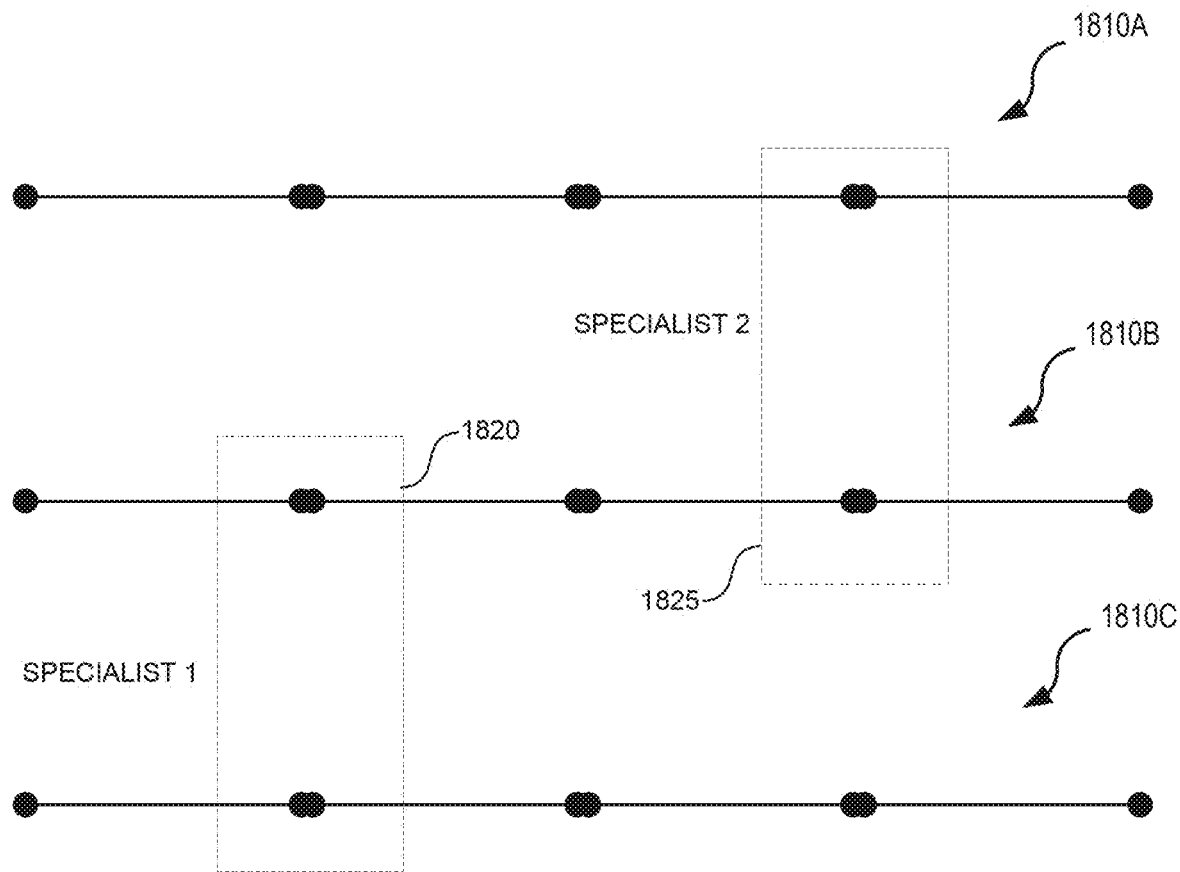
FIG. 18 is a graph that illustrates multiple steps performed by sub-contractors across multiple customer journeys.

For example, FIG. 18 illustrates multiple steps performed by sub-contractors across multiple customer journeys 1810A-C. A single specialist (e.g., "specialist 1") provides a product (shown as box 1820) as part of two different customer journeys 1810B and 1810C, while another specialist (e.g., "specialist 2"), provides a service (shown as box 1825) as part of two different customer journeys 1810A and 1810B.

The journey coordination system 1350, having knowledge of all interactions and transactions associated with the service provider, may facilitate the exchanges of information between the service provider (or, via the service provider) and the specialists or sub-contractors, including exchanging information (e.g., customer information, journey information, product or service information, and so on) associated with the journey (journey 1820B) shared by the sub-contractors. Thus, the journey coordination system 1350 may facilitate an efficient coordination (e.g., messaging or other information exchanges) of specialists providing common or similar products or services within multiple customer journeys, among other things.

In some embodiments, the journey coordination system 1350 may also perform and utilize various analytics when determining how to coordinate the provision of services/products within managed journeys and/or overall transactions. For example, the journey coordination system 1350 may include an analytics module or system that measures certain metrics associated with the performance of actions (e.g., provision of actions), in order to identify sub-contractors and other specialists having a high reliability or quality with respect to customer satisfaction.

The journey coordination system 1350 may determine, for some or all associated sub-contractors, some or all of the following:

1. Whether the sub-contractor performed an action (e.g., completed a path within a determined journey for a customer);

2. The satisfaction of the customer associated with the performed action (e.g., determined via contents of messages (e.g., keywords, emoticons, and so on) received from customer, such as "great work!!", and/or via analytics associated with timeliness, completion, and so on);

Whether the sub-contractor performed one or more actions associated with a completed journey (transaction) for the customer, including a journey completed within certain constraints (e.g., time, cost, and so on); and so on The journey coordination system 1350 may rank or otherwise identify certain sub-contractors that rate highly against these metrics, and escalate their use in ongoing or future transactions managed by the service provider.

The following example scenarios provide details regarding the implementation of the journey coordination system 1350. Other example scenarios are of course possible.

Scenario 1—The Birthday Party: A customer contacts a bakery to purchase a birthday cake. The system 1350 accesses the request, identifies a goal of making arrangements for a birthday party, and selects sub-contractors to fulfill the goal. For example, the system 1350 establishes a transaction between the customer and the bakery to provide payment for the cake, orders 10 gift bags from a gift shop for the party, and arranges delivery of the gift bags to the home of the customer by scheduling the delivery via a mobile application for the delivery service. Thus, the system 1350 creates and follows a journey of "buy cake," "buy gift bags," and "schedule delivery of cake and bags" in order to fulfill the goal of arrange birthday party.

Scenario 2—Buying a Car: A customer sees a bank loan promotion for purchasing a new car, and starts a conversation, by sending a message to the bank. The system 1350 receives the request, provides an interface to online services that have available cars that meet the promotion, and connects the customer with the dealers of the cars. Once a car is selected, the system 1350 finalizes the financing via the bank, and provides access to online services for insuring and registering the car for the customer.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the Specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system, comprising:
    a messaging module that accesses a message from a customer of a service provider, wherein the message includes content representing a request from the customer to provide one or more services that combine to fulfill a goal;
    a services module that identifies one or more sub-contractors capable of providing the one or more services that combine to fulfill the goal;
    a journey module that determines a journey of actions to be performed with respect to the identified sub-contractors to fulfill the goal;
    an action module that performs the actions within the selected journey of actions; and
    a goal determination module that determines the goal based on content of the message.

2. The system of claim 1, wherein the journey module:
    builds a graph of paths connected to one another by nodes, wherein each of the paths represents a service provided by a subcontractor, and wherein an unbroken connection of paths between a beginning node and one or more ending nodes represents a journey to a goal; and
    selects a journey within the graph that connects the beginning node to the goal based on one or more constraints applied to the goal.

3. The system of claim 1, wherein the messaging module accesses a message sent by the customer to a customer support system of the service provider.

4. The system of claim 1, wherein the messaging module accesses a message sent by the customer to a customer support system of one of the identified sub-contractors.

5. The system of claim 1, wherein the action module performs an action to facilitate completion of a transaction between the customer and one of the identified sub-contractors.

6. The system of claim 1, wherein the action module performs an action to facilitate an exchange of information between the customer and multiple identified sub-contractors.

7. The system of claim 1, wherein the action module performs an action to provide information about a service provided by a first sub-contractor to a second sub-contractor providing a service that is complementary to the service provided by the first sub-contractor.

8. The system of claim 1, wherein the message includes content representing a request from the customer to one of the identified sub-contractors to provide a service that is part of a group of services that fulfill a goal; and wherein the journey module creates a journey of actions to be performed with respect to the identified sub-contractors in order to facilitate provision of other services of the group of services that fulfill the goal.

9. A method, comprising:
    accessing one or more messages between a customer and a service provider, wherein the one or more messages include content representing a request from the customer to provide one or more services that combine to fulfill a goal;
    identifying the goal based on content of the one or more messages;
    identifying one or more sub-contractors capable of providing the one or more of the services that combine to fulfill the goal;

determining a journey of actions to be performed with respect to the identified sub-contractors to fulfill the goal, by:
> building a graph of paths connected to one another by nodes, wherein each of the paths represents a service provided by a subcontractor, and wherein an unbroken connection of paths between a beginning node and one or more ending nodes represents a journey to a goal; and
> selecting a journey within the graph that connects the beginning node to the goal based on one or more constraints applied to the goal; and performing the actions within the selected journey of actions.

10. The method of claim 9, wherein selecting a journey within the graph that connects the beginning node to the goal based on one or more constraints applied to the goal includes selecting a journey based on one or more time constraints for fulfilling the goal identified in the accessed one or more messages.

11. The method of claim 9, wherein selecting a journey within the graph that connects the beginning node to the goal based on one or more constraints applied to the goal includes selecting a journey based on one or more cost constraints for fulfilling the goal identified in the accessed one or more messages.

12. The method of claim 9, wherein selecting a journey within the graph that connects the beginning node to the goal based on one or more constraints applied to the goal includes selecting a journey based on one or more sub-contractor review constraints for fulfilling the goal identified in the accessed one or more messages.

13. The method of claim 9, wherein accessing one or messages between a customer and a service provider includes accessing messages sent by the customer to a customer support system of the service provider.

14. The method of claim 9, wherein accessing one or messages between a customer and a service provider includes accessing messages sent by the customer to a customer support system of one of the identified sub-contractors.

15. The method of claim 9, wherein performing the actions within the selected journey of actions includes establishing a conversation between the customer and one of the identified sub-contractors to facilitate completion of a transaction.

16. The method of claim 9, wherein performing the actions within the selected journey of actions includes establishing a conversation between the customer and one of the identified sub-contractors to facilitate an exchange of information between the customer and the identified sub-contractors.

17. A computer-readable storage medium, excluding transitory signals, whose contents, when executed by a computing system, cause the computing system to perform one or more operations for connecting customers to sub-contractors, the operations comprising:
> accessing one or messages between a customer and a sub-contractor, wherein the one or more messages include content representing a request from the customer for the sub-contractor to provide one or more services that combine to fulfill a goal;
> identifying the goal based on content of the one or more messages;
> identifying one or more other sub-contractors capable of providing the other one or more of the services that combine to fulfill the goal;
> determining a journey of actions to be performed with respect to the identified sub-contractors to fulfill the goal, by:
>> building a graph of paths connected to one another by nodes, wherein each of the paths represents a service provided by a subcontractor, and wherein an unbroken connection of paths between an entry node and one or more ending nodes represents a journey to a goal; and
>> selecting a journey within the graph that connects the entry node to the goal based on one or more constraints applied to the goal; and
>
> performing the actions within the selected journey of actions.

18. The computer-readable storage medium of claim 17, wherein selecting a journey within the graph that connects the beginning node to the goal based on one or more constraints applied to the goal includes selecting a journey based on one or more time constraints for fulfilling the goal identified in the accessed one or more messages.

19. The computer-readable storage medium of claim 17, wherein selecting a journey within the graph that connects the beginning node to the goal based on one or more constraints applied to the goal includes selecting a journey based on one or more cost constraints for fulfilling the goal identified in the accessed one or more messages.

20. The system of claim 1, wherein the goal determination module determines the goal based on at least one keyword in the message.

* * * * *